US011564435B2

(12) United States Patent
Chope et al.

(10) Patent No.: US 11,564,435 B2
(45) Date of Patent: Jan. 31, 2023

(54) AUTOMATED GARMENT MANUFACTURING USING CONTINUOUS WEBS OF FABRIC

(71) Applicant: CreateMe Technologies LLC, New York, NY (US)

(72) Inventors: Nicholas Chope, Portland, OR (US); Eric Berner Strom, Vancouver, WA (US); Khamvong Thammasouk, San Jose, CA (US); Yongqiang Li, Sunnyvale, CA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/711,282

(22) Filed: Apr. 1, 2022

(65) Prior Publication Data

US 2022/0225717 A1    Jul. 21, 2022

Related U.S. Application Data

(63) Continuation-in-part of application No. 17/535,464, filed on Nov. 24, 2021.

(60) Provisional application No. 63/117,942, filed on Nov. 24, 2020.

(51) Int. Cl.
*A41H 42/00* (2006.01)
*A41H 43/04* (2006.01)
(Continued)

(52) U.S. Cl.
CPC .......... *A41H 42/00* (2013.01); *A41H 43/0242* (2013.01); *A41H 43/04* (2013.01);
(Continued)

(58) Field of Classification Search
CPC .............. B65H 23/044; B65H 23/1888; B65H 23/192; A41H 43/04; B32B 38/1825; B32B 38/1875; B32B 38/1883; B32B 37/1292
See application file for complete search history.

(56) References Cited

U.S. PATENT DOCUMENTS 3,681,785 A   8/1972  Truman
3,696,445 A  10/1972  Craig
(Continued)

FOREIGN PATENT DOCUMENTS

DE   102011101484 A1   11/2012
JP      2017222969 A   12/2017
(Continued)

OTHER PUBLICATIONS

PCT, Notification of Transmittal of The International Search Report and The Written Opinion of The International Searching Authority, or The Declaration for Application PCT/US2021/060801 dated Mar. 17, 2022.

*Primary Examiner* — Scott W Dodds
(74) *Attorney, Agent, or Firm* — Patterson + Sheridan, LLP

(57) ABSTRACT

Embodiments herein describe automated systems and methods to assemble a garment, such as a T-shirt. Some embodiments provide for systems and methods for transferring and manipulating fabrics and joining garment components during garment manufacturing in a way that is more suitable to automation. Some embodiments provide for garment manufacturing systems and methods that are reconfigurable to enable both mass production of customized garments and small batch processing with reduced human intervention.

12 Claims, 13 Drawing Sheets

(51) Int. Cl.
*A41H 43/02* (2006.01)
*B32B 38/18* (2006.01)
*B65H 23/188* (2006.01)
*B32B 37/12* (2006.01)
*B65H 23/192* (2006.01)
*B32B 38/00* (2006.01)
*B65H 23/04* (2006.01)

(52) U.S. Cl.
CPC ...... *B32B 38/1825* (2013.01); *B32B 37/1292* (2013.01); *B32B 38/1875* (2013.01); *B32B 2437/00* (2013.01); *B65H 23/044* (2013.01); *B65H 23/1888* (2013.01); *B65H 23/192* (2013.01)

(56) References Cited

U.S. PATENT DOCUMENTS

| | | |
|---|---|---|
| 4,145,388 A | 3/1979 | Off et al. |
| RE30,520 E | 2/1981 | Pierron |
| 4,493,116 A | 1/1985 | Niethammer et al. |
| 4,509,443 A | 4/1985 | Martell et al. |
| 4,795,956 A * | 1/1989 | Beck .................... B21D 43/021 318/135 |
| 9,623,578 B1 | 4/2017 | Aminpour et al. |
| 10,664,629 B2 | 5/2020 | Gupta et al. |
| 10,842,213 B2 | 11/2020 | Campbell, Jr. |
| 11,014,347 B2 | 5/2021 | Brown et al. |
| 2003/0051286 A1 | 3/2003 | Gregg |
| 2005/0087607 A1* | 4/2005 | Stromberg ......... G06K 19/0775 235/492 |
| 2009/0018691 A1 | 1/2009 | Fernandez |
| 2009/0031870 A1* | 2/2009 | O'Connor ............. B25B 11/005 269/21 |
| 2011/0076479 A1 | 3/2011 | Danielson et al. |
| 2013/0254970 A1 | 10/2013 | Curran et al. |
| 2017/0112687 A1* | 4/2017 | Pauli ....................... A61L 15/62 |
| 2019/0125591 A1* | 5/2019 | Hagita ................ A61F 13/2082 |

FOREIGN PATENT DOCUMENTS

| | | |
|---|---|---|
| WO | 2017175706 A1 | 10/2017 |
| WO | 2020184779 A1 | 9/2020 |

* cited by examiner

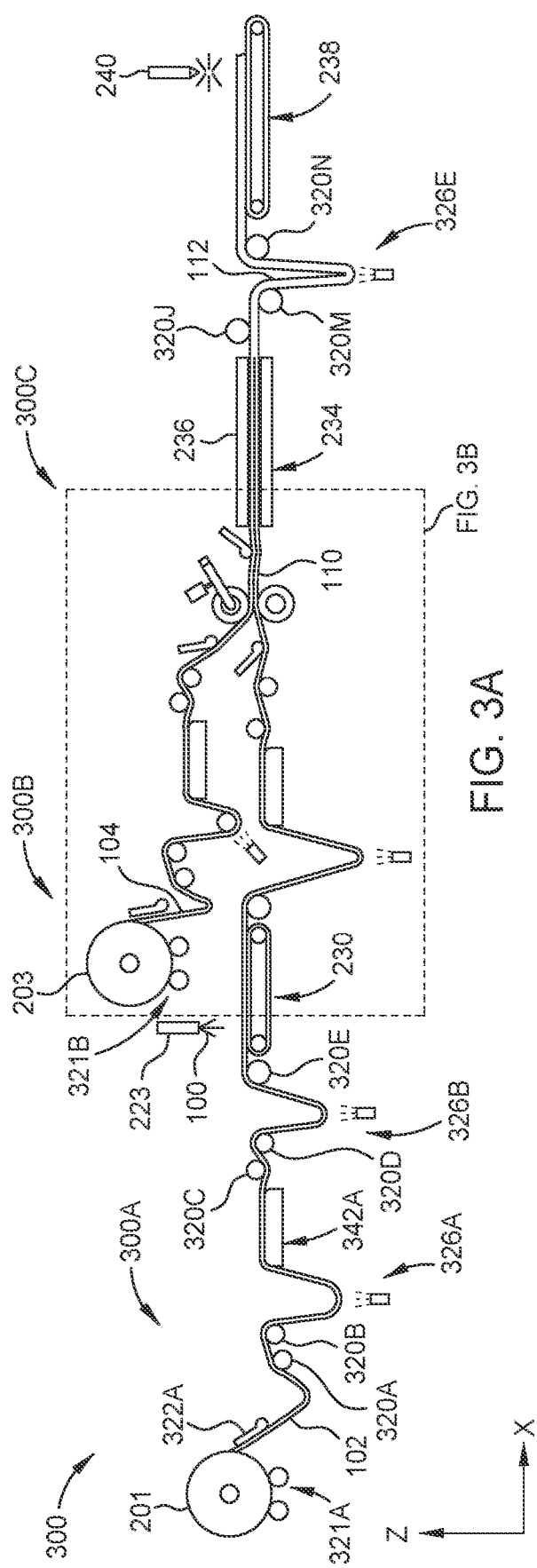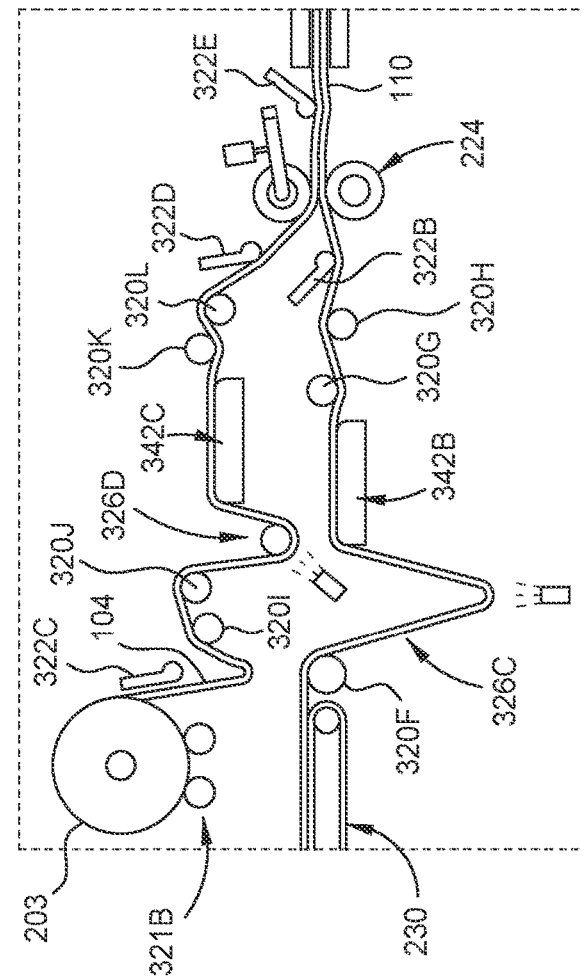
FIG. 3A
FIG. 3B

AUTOMATED GARMENT MANUFACTURING USING CONTINUOUS WEBS OF FABRIC

CROSS-REFERENCE TO RELATED APPLICATIONS

This application is a continuation-in-part of co-pending U.S. patent application Ser. No. 17/535,464, filed Nov. 24, 2021 entitled "AUTOMATED GARMENT MANUFACTURING USING ADHESIVE BONDING", which claims the benefit of U.S. Provisional Patent Application No. 63/117,942, filed Nov. 24, 2020, each of which is incorporated by reference herein in its entirety.

BACKGROUND

Despite technological advances and introduction of automation in many types of manufacturing, garment manufacturing remains very labor intensive. Sewing machines were invented in the early nineteenth century and were made possible based on the development of the lock stitch sewing technique. Today, some hundred fifty years later, this same technology remains the foundation of garments manufacturing. The modern process of producing large quantities of ready-to-wear apparels relies heavily on manual labor and remains inefficient relative to other industrial manufacturing processes. Garment manufacturing includes multiple steps including sizing, folding, fitting, cutting, sewing, material handling. The type of tasks needed dictates the level of skilled labor that is required to perform the work. The unique and varied properties of fabric such as weight, thickness, strength, stretchiness and draping as well as the complicated nature of tasks required in apparel manufacturing complicates material handling and automated garment manufacturing.

In most small and large apparel manufacturing factories, most of the material handling and apparel manufacturing operations are conducted in a manual or semi-manual manner. The garment manufacturing process may start with laying out a web of fabric for 24 hours to relax the fabric and remove wrinkles. Then, one or more layers of fabric may be cut based on patterns and dimensions matching the desired garment. Then, the cut fabric patterns are transferred from workstation to workstation, where at each workstation, one, two, or more pieces of fabrics are manually folded, overlapped along the seams and fed into a sewing machine or serger machine (also referred to as an overlocker machine). Given the variety of fabrics, threads, seam types, and stitch types found in a finished garment, a larger number of workstations with specialized tools and skilled operators is required for assembling a garment. This means the fabrics or unfinished garments spend much time in transit between workstations, which adversely affects the time to process a garment. Thus, traditional apparel manufacturing operations may include multiple sequential processes. Further, a time constant may be required between each operation to allow the fabric to relax, which further increases the time required to process a garment.

Despite advances in technology, machines still struggle with performing certain tasks that are easily handled by a trained worker with average hand-eye coordination skills. This is one reason garment manufacturing industry is in a constant search of cheaper human labor rather than investing in advanced automated manufacturing systems. To increase production, a factory may add additional production lines in parallel, which does little to improve efficiency. Even in large factories, most work is performed in piecemeal fashion, with limited coordination between various stations/steps, and movement of material between each station requires a great deal of manual product handling.

Accordingly, there is a need for an automated system for processing garments to increase efficiency and reduce reliance on manual labor.

SUMMARY

Certain embodiments provide a system for automated manufacturing of garments. The system includes a first fabric transport system configured to move a first web of fabric from a first fabric roll. The system further includes a second fabric transport system configured to move a second web of fabric from a second fabric roll. The system further includes an adhesion system. The adhesion system includes an adhesive dispenser configured to apply an adhesive to at least part of at least one of the first web of fabric and the second web of fabric. The system further includes a plurality of fabric preparation systems configured to provide slack in at least one of the first web of fabric and the second web of fabric while the first fabric transport system moves the first web of fabric and the second fabric transport system moves the second web of fabric. Each fabric preparation system of the plurality of fabric preparation systems includes a motorized roller configured to feed the first web of fabric or the second web of fabric. Each fabric preparation system further includes a non-contact measurement sensor for measuring the slack in the first web of fabric or the second web of fabric. The motorized roller adjusts a rotation rate based on the non-contact measurement sensor. The system further includes a cutting station configured to cut the coupled first and second webs of fabric into a garment.

Other embodiments provide a system for automated manufacturing of garments. The system includes a fabric preparation system configured to prevent stretching in a web of fabric while the web of fabric moves through the system. The fabric preparation system includes a motorized roller configured to feed the web of fabric. The fabric preparation system further includes a non-contact measurement sensor for monitoring stretching in the web of fabric. The motorized roller adjusts a rotation rate based on the non-contact measurement sensor. The system further includes a relaxer station. The relaxer station includes an air table configured to force air through perforations in a surface of the air table to relax the web of fabric. The system further includes a first fabric transport system configured to move the web of fabric from a fabric roll. The first fabric transport system includes the fabric preparation system. The first fabric transport system further includes an adhesion station configured to dispense an adhesive on a first portion of the web of fabric. The first fabric transport system further includes a folding station configured to fold the web of fabric along a fold line to form a folded web of fabric. A first portion of the web of fabric is folded over a second portion of the web of fabric. The system further includes a second fabric transport system configured to adhere the web of fabric to itself to form an adhered web of fabric. The second fabric transport system includes an adhesion activator station configured to cure the adhesive to form the adhered web of fabric. The second fabric transport system further includes a cutting station configured to cut the adhered web of fabric into a garment.

Other embodiments provide a method for automated manufacturing of garments. The method includes moving a first web of fabric from a first fabric roll. A fabric preparation system provides slack in the first web of fabric. The fabric preparation system includes a motorized roller configured to feed the first web of fabric. The fabric preparation system further includes a non-contact measurement sensor for measuring the slack in the first web of fabric. The motorized roller adjusts a rotation rate based on the non-contact measurement sensor. The method further includes applying adhesive to at least part of the first web of fabric using an adhesion system. The method further includes joining the first web of fabric to itself or to a second web of fabric to form contours of a garment using a fabric joining system. The method further includes cutting the contours of the garment using a cutting station to form a detached garment.

BRIEF DESCRIPTION OF THE DRAWINGS

So that the manner in which the above-recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIGS. 3A and 3B are schematic side views of an automated garment manufacturing system, according to one embodiment.

DETAILED DESCRIPTION

Figure 1A:
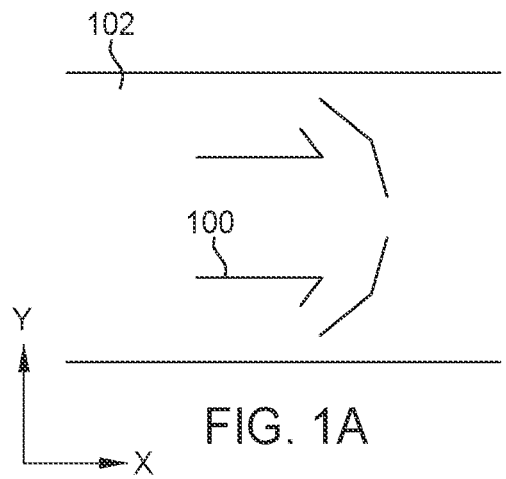
FIGS. 1A-1D are schematic overhead views of a garment assembly process, according to one embodiment.

Embodiments herein describe automated systems and methods to assemble a garment, such as a T-shirt. Some embodiments provide for systems and methods for transferring and manipulating fabrics and joining garment components during garment manufacturing in a way that is more suitable to automation. Some embodiments provide for garment manufacturing systems and methods that are reconfigurable to enable both mass production of customized garments and small batch processing with reduced human intervention.

As previously discussed above, traditional methods of making a garment require a time constant in between each operation to allow the fabric to relax so that different fabrics will not wrinkle or bunch when assembled. Additionally, reliance on manual labor, especially labor with specialized skills is expensive, and inherently more prone to errors depending on the required skill, resulting in products lower yields due to higher defects, resulting in more rejections and increase costs. Therefore, there is a need to significantly reduced reliance on manual product manipulation and handling, promote continuous garment manufacturing methods over piecemeal processing, and offer flexible systems that can mass produce items while allowing for customized production.

Embodiments herein describe systems and processes that may use continuous webs of fabric to create garments, which beneficially does not require manually moving pieces of a garment in between assembly stations during assembly of the garment. The process may be a continuous process, such that the webs of fabric move continuously through the system. The process may also be a discrete process, such that that the webs of fabric move through the system in a digitized or stepped manner. Embodiments described herein further describe systems and processes that may use a single web of fabric or multiple webs of fabric to form a garment.

Embodiments herein may combine an adhesive to effect the permanent bonding of a variety of types of fabric, with a series of integrated mechanical processes to eliminate or greatly reduce material handling issues and the human intervention traditionally required in the garment manufacturing process. This may increase the speed and efficiency of the garment assembly processes, improve the overall quality of the finished garments, and provide for flexible systems that can mass produce items while allowing for customized production, whereby production items can be adjusted to individual size and style.

Embodiments described herein further provide a means to relax the webs of fabric before any of the garment assembly operations, such as through use of a fabric preparation system or a relaxer station. The fabric preparation system and relaxer stations each relax the fabric, either in a continuous or stepped manner, while the webs of fabric are moved through the system. The fabric preparation system and relaxer stations further allow the system to process the webs of fabric without requiring a time constant, such as a 24-hour rest period, in between operations. In some embodiments, relaxing the fabric may be referred to as fabric relaxation. In some embodiments, fabric relaxation may be the substantial removal of any strain on the fabric, including stretching the fabric.

The embodiments herein are described with reference to the manufacture of T-shirts. However, it would be understood that these described embodiments may be easily adapted to produce other types of garments including long sleeve shirts, dress shirts, jackets, pants, gloves, or non-garment products such as bedsheets, pillowcase, tablecloth, rugs or handbags, etc. Therefore, the embodiments described herein should not be interpreted as limiting the scope of the present disclosure.

Example Garment Assembly Process

FIGS. 1A-1D are schematic overhead views of a garment assembly process, according to one embodiment. In particular, FIG. 1A shows an adhesive 100 bondline dispensed on a first web of fabric 102. The adhesive 100 may be applied through different means, such as through an adhesive dispenser 232 of an adhesion station 230 as discussed in relation to FIG. 2A. In some embodiments, bondline refers to the regions on the fabric that may be used to join two or more plies of fabric using one or more processes such as folding, forming a seam, sewing, depositing adhesive, pressing, and heating. In the depicted embodiment, the adhesive 100 follows a pattern for making a T-shirt (e.g., a T-shirt 114 in FIG. 1C) such that contours of the neck, arm, and torso holes are not outlined by an adhesive 100. The contours with no adhesive 100 may remain open and form the neck, arms, and body holes after the final cutting and finishing steps of the T-shirt 114 as further described below.

Figure 1B:
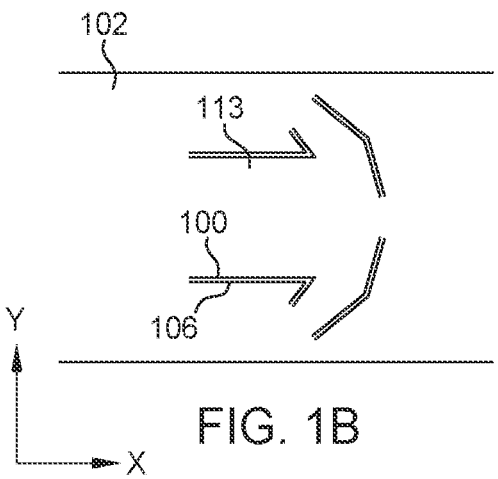

The embodiment in FIG. 1B depicts cut lines 106 used to cut contours in the first web of fabric 102 to form a front or a back side 113 of the T-shirt 114. The cut lines 106 may be used to guide a subsequent cut in the garment assembly process, such as discussed in relation to FIG. 1D. In some embodiments, the cut lines 106 may be such that a portion of the first web of fabric 102 is removed (e.g., the cut lines 106 form a closed shape). In some embodiments, the cut lines 106 may be cut at the same time the adhesive 100 is applied.

Figure 1C:
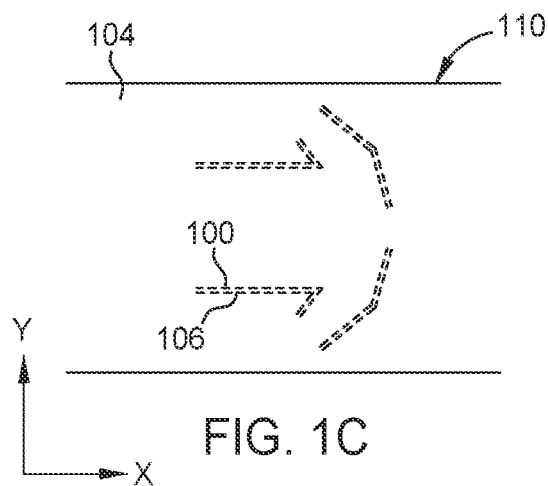

The embodiment in FIG. 1C depicts a second web of fabric 104 overlaid on top of the first web of fabric 102 (not visible) to form layered webs of fabric 110. The first and second webs of fabric 102 and 104 may be pressed together as described in relation to FIGS. 2A and 2B. The adhesive 100 may be cured to secure the second web of fabric 104 to the first web of fabric 102 to form adhered webs of fabric 112 (FIG. 1D).

In the depicted embodiments, the first and second webs of fabric 102 and 104 are a same width. In some embodiments, the first and second webs of fabric 102 and 104 may be different widths. For example, the first web of fabric 102 may have a larger width than the second web of fabric 104 and vice versa.

Figure 1D:
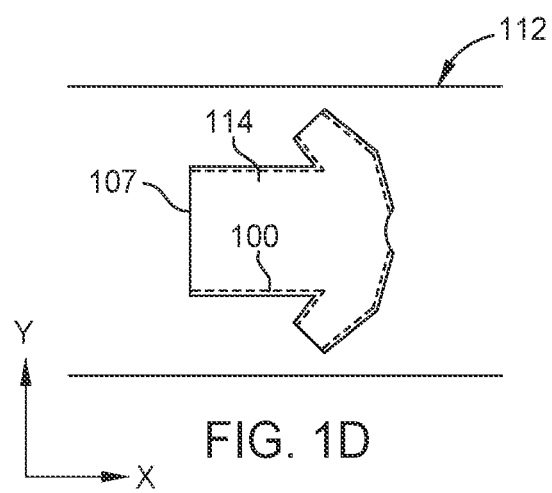

The embodiment in FIG. 1D depicts cut lines 107 used to cut the T-shirt 114 from the adhered webs of fabric 112. The adhered webs of fabric 112 may be cut through different means, such as a cutting station 238 discussed in relation to FIG. 2A. In the depicted embodiment, the cut line 107 follows a pattern or contours of the T-shirt 114. The T-shirt 114 may be removed from the adhered webs of fabric 112 and continue to other operations of the garment assembly process, such as adding a collar or sleeves. In the depicted embodiment, the T-shirt 114 is inside out such that a portion of the T-shirt 114 that would contact a body of a wearer is shown. For example, the T-shirt 114 may be turned inside out prior to being worn to hide seams formed where the first and second webs of fabric 102 and 104 are adhered. In some embodiments, the T-shirt 114 may not need to be turned inside out after the T-shirt 114 is cut from the adhered webs of fabric 112.

In some embodiments, the adhesive 100 may be applied to the second web of fabric 104, either instead of or in addition to the first web of fabric 102. For example, the adhesive dispenser 232 (or a different adhesive dispenser 232) may also apply the adhesive 100 to the second web of fabric 104, which may beneficially form a stronger bond in the adhered webs of fabric 112.

Figure 4A:
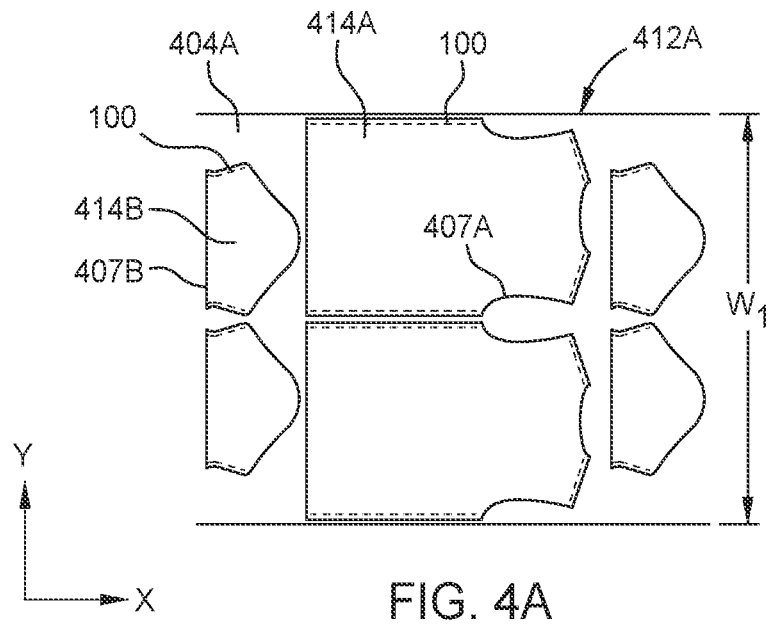
FIGS. 4A and 4B are schematic overhead views of a garment assembly process, according to one embodiment.
Figure 4B:
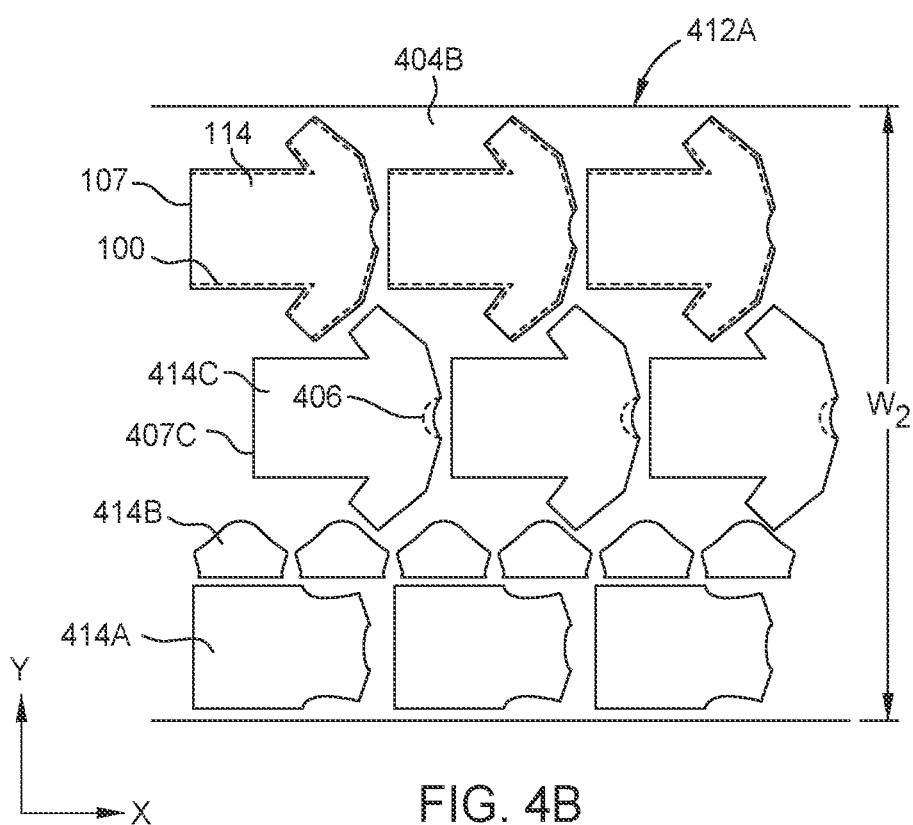

In some embodiments, the cut lines 106 may include a cut for a collar for the T-shirt 114 that may be deeper or shallower than the cut for the collar used in cut lines 107 such as discussed in relation to FIG. 4B. In some embodiments, the garment assembly process may not include the cut lines 106. In some embodiments, at least one of the first and second webs of fabric 102 and 104 may be temporarily marked by visible, invisible, or washable ink to identify the contours of the T-shirt 114. For example, such temporary markings may be used as a guide to form the cut lines 107.

Examples of Automated Garment Manufacturing Systems

Figure 2A:
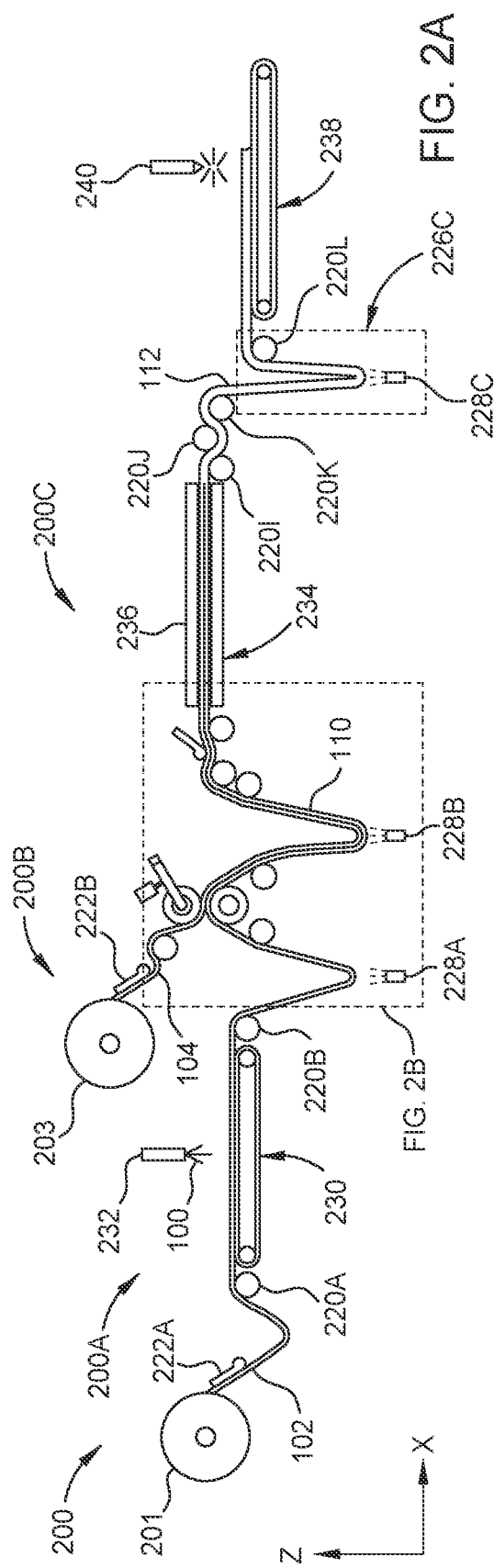
FIGS. 2A and 2B are a schematic side view of an automated garment manufacturing system, according to one embodiment.
Figure 2B:
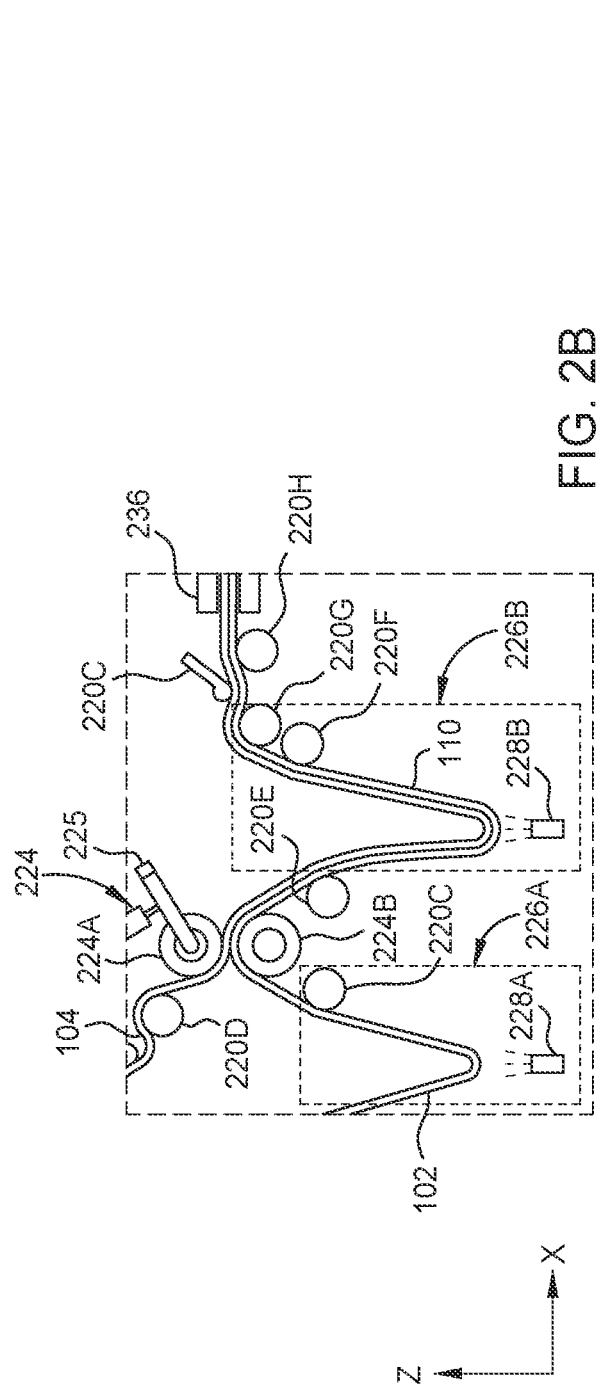

FIGS. 2A and 2B are schematic side views of an automated garment manufacturing system 200, according to one embodiment. In particular, FIG. 2B is an enlarged view of a section of the automated garment manufacturing system 200 (referred to as the system 200) shown in FIG. 2A.

The system 200 comprises a first fabric transport system 200A and a second fabric transport system 200B. The first fabric transport system 200A moves a first web of fabric 102 from a first fabric roll 201. The first fabric roll 201 may rotate about its axis and dispense the first web of fabric 102 along the x-axis. Similarly, the second fabric transport system 200B moves a second web of fabric 104 from a second fabric roll 203 and may rotate about its axis and dispense the second web of fabric 104 along the x-axis. The system 200 manufactures a plurality of garments from the first and second webs of fabric 102 and 104, wherein the plurality of garments includes a first garment and a second garment. The first garment may be the same as the second garment (e.g., both are T-shirts 114), or the first garment may be different from the second garment, such as discussed in relation to FIGS. 4A and 4B. In some embodiments, the fabric rolls 201 and 203 may be mounted on a motorized roller that feeds the webs of fabric 102 and 104 to the system 200. In some embodiments, fabric roll 201 and 203 are coupled to one or more actuators, gears, motors (continuous or step) that rotate at a selected speed pulling or pushing the webs of fabric 102 and 104 along the x-axis. In some embodiments, fabric rolls 201 and 203 are free to move but are not mounted on motorized shafts.

An adhesion station 230 applies the adhesive 100 to at least part of at least one of the first and second webs of fabric 102 and 104. In the depicted embodiment, the adhesive dispenser 232 applies the adhesive 100 to the first web of fabric 102 using a predetermined pattern, such as a pattern that follows contours of a garment (e.g., the T-shirt 114) as discussed in relation to FIG. 1A. The adhesion station 230 may also form a cut in the first web of fabric 102 such as discussed in relation to FIG. 1B. In some embodiments, multiple adhesive dispensers 232 may be used to form a bondline for a garment, which beneficially reduces the time required to apply the adhesive 100. The multiple adhesive dispensers 232 may also be used to simultaneously form adhesive 100 bondlines for multiple garments, such as discussed in relation to FIGS. 4A and 4B.

The system 200 further comprises a third fabric transport system 200C, which adheres the first web of fabric 102 to the second web of fabric 104. The third fabric transport system 200C may include a fabric joining system to prepare the webs of fabric 102 and 104 to be bonded by the adhesive 100. In the depicted embodiment, the fabric joining system comprises pinch rollers 224 (also referred to as nip rollers), which apply a force to press the webs of fabric 102 and 104 together to form the layered webs of fabric 110. The adhesive 100 may bond the webs of fabric 102 and 104 as a result of the applied force. The pinch rollers 224 include a top roller 224A and a bottom roller 224B. At least one of the rollers 224A and 224B may be motorized to pull (e.g., feed or dispense) the webs of fabric 102 and 104 through the pinch rollers 224. In the depicted embodiment, the top roller 224A is mounted to an arm 225 and may provide an adjustable or fixed force to the webs of fabric 102 and 104. The fabric preparation systems 226A and 226B, which beneficially ensures the layered webs of fabric 110 do not recoil or distort after being pressed together.

The third fabric transport system 200C may further include an adhesion activator station 234 used to cure the adhesive and form the adhered webs of fabric 112. In the depicted embodiment, the adhesion activator station 234 comprises a heat press 236 that cures the adhesive 100 to couple the first web of fabric 102 to the second web of fabric 104. The layered webs of fabric 110 enter the adhesion activator station 234 and the heat press 236 applies a heat to the layered webs of fabric 110 to cure the adhesive 100 and permanently bond the webs of fabric 102 and 104. In some embodiments, the heat press 236 may also apply a force on the layered webs of fabric 110 when curing the adhesive 100. The adhesion station 230 and the adhesion activator station 234 may be collectively referred to as an adhesion system. In some embodiments, the adhesion system may not include the adhesion activator station 234. In some embodiments, the fabric joining system (e.g., the pinch rollers 224) may considered part of the adhesion system.

The third fabric transport system 200C may further include a cutting station 238 that cuts the coupled first and second webs of fabric 102 and 104 (e.g., the adhered webs of fabric 112) into a garment (e.g., the T-shirt 114) or a partially formed garment. In the depicted embodiment, the cutting station 238 comprises a cutting device 240. The cutting device 240 may be at least one of a die cutter, kiss cutter, laser cutter, and the like. The cutting device 240 may cut along the borders or contours of the formed garment (e.g., the T-shirt 114) to detach the garment from the adhered webs of fabric 112. For example, the cutting device 240 may cut the adhered webs of fabric 112 outside of the adhesive 100, at the edge of the adhesive 100, or along an area within the adhesive 100. In some embodiments, the cutting device 240 may be a rotary die cutter. In some embodiments, the cutting device 240 may be apply heat energy simultaneously with or after the cutting operation to melt or remelt the adhesive, the adhered webs of fabric 112, or both to produce finished seams that are aesthetically more desirable, physically durable (e.g., prevent fraying), or both.

The formed garment may be collected in one stack while the adhered webs of fabric 112, now having a garment shaped cutout, may be collected in a web for disposal or additional processing. For example, the excess fabric remaining on the adhered webs of fabric 112 may be used to create components for seams, pockets, belt loops, etc. The cut garment may be manually picked after being cut. In some embodiments, an automated system, such as a robotic arm with a gripper end effector may pick the cut garment. The garment may be placed on a table for sorting or may continue to other operations of the garment assembly process, such as adding a collar or sleeve cuff.

The system 200 further includes a plurality of rollers 220 to move the webs of fabric 102, 104, 110, and 112 (hereafter referred to as webs). The rollers 220 may include any combination of fixed rollers, such as idler rollers, or motorized rollers, such as drive rollers or driven guide rollers. For example, actuators or motors may be located on at least a subset of the rollers 220, providing pull or push forces acting on the webs of fabric 102 and 104. The rollers 220 may also include anti-wrinkle rollers or augers to spread the webs of fabric transversely to stretch wrinkles out of the fabric. In some embodiments, the anti-wrinkle rollers or augers may include a roller on each side of the webs or set of rollers on each side of the webs. The rollers of each side may contact the webs at angle that is not perpendicular to the webs such that each roller pulls the webs towards the sides of the webs to release wrinkles. In some embodiments, the anti-wrinkle rollers or augers may be include a roller that is perpendicular to the webs that spreads the webs as the webs pass over the anti-wrinkle roller or auger. In the depicted embodiment, rollers 220A and 220B are positioned before and after the adhesion station 230, respectively. The rollers 220A and 220B may be used to guide the first web of fabric 102 into and out of the adhesion station 230. In some embodiments, the at least one of rollers 220A and 220B may be a motorized roller to pull the first web of fabric 102 from the first fabric roll 201 and feed the first web of fabric 102 into and pull the first web of fabric 102 out of the adhesion station 230. A roller 220D or the pinch rollers 224 may similarly be used to pull the second web of fabric 104 from the second fabric roll 203.

The system 200 may also include a plurality of dancer roll tension controls 222 (referred to as dancer bars or dancers) to maintain a consistent tension in the webs of fabric 102, 104, 110, and 112. For example, the dancers 222 may ensure the webs are at substantially the same non-zero tension or strain when joining the webs. The dancers 222 may include an idler roller mounted to a dancer arm and a sensor to detect a position of the idler roller. For example, the dancer arm may include any one of a potentiometer, encoder, or angle sensor to sense an angle of the dancer arm. The sensed angle is compared to a set or "zero" position to detect if the idler roller position has changed and a rotation speed of a roller 220 may be adjusted until the sensed angle returns to the set position. For example, in the depicted embodiment, a dancer 222A may rotate clockwise or counterclockwise as shown on the page if there is too little or too much tension in the first web of fabric 102. The rotation speed of the roller 220A may then be increased or decreased to return the dancer 222A to the set position shown on the page.

A plurality of fabric preparation systems 226 (e.g., fabric preparation systems 226A, 226B, and 226C) provides slack in at least one of in the webs, which allows the webs to sag, while the first fabric transport system 200A moves the first web of fabric 102 and the second fabric transport system 200B moves the second web of fabric 104 through the system 200. The fabric preparation systems 226 prevent stretching or cause relaxation in the webs such that the slack in the webs allows the system 200 to move the webs without stretching the webs, which beneficially helps maintain the webs in an approximately equal tension state (e.g., a non-zero tension state) such that there is an equal and controllable tension between the webs (e.g., the webs of fabric 102 and 104). In some embodiments, or for certain fabrics, the slack in the webs may stretch the webs under their own weight. In such embodiments, the fabric preparation systems 226 match a strain level in all fabric webs of plies prior to joining them. The slack may also relax and reduce wrinkles in the webs. Each fabric preparation system 226 of the plurality of fabric preparation systems 226 comprises a motorized roller to pull at least one of the webs and a non-contact measurement sensor 228 (e.g., non-contact measurement sensors 228A, 228B, or 228C) to measure the slack or monitor the stretching in the at least one of the webs. The non-contact measurement sensor 228 may be used to control a rotation speed of the motorized roller such that the motorized roller adjusts a rotation rate based on the non-contact measurement sensor. For example, in the fabric preparation system 226A, which is positioned before the pinch rollers 224, a non-contact measurement sensor 228A may measure a distance (D) between the sensor and the first web of fabric 102. If the distance measured is outside a threshold, a rotation speed of a roller 220C or the top roller 224A may be increased or decreased to either increase or decrease the slack in the first web of fabric 102. Thus, the plurality of fabric preparation systems 226 use the non-contact measurement sensor 228 to control the motorized rollers to push and pull the webs at such a rate so as to not stretch the webs.

The system 200 also includes the fabric preparation system 226B before the adhesion activator station 234 and the fabric preparation system 226C before the cutting station 238. In the depicted embodiment, a motorized roller 220G of the fabric preparation system 226B in controlled by the non-contact measurement sensor 228B. Fixed rollers 220E, 220F, and 220H guide the layered webs of fabric 110 into the adhesion activator station 234, and a dancer 222C maintains a consistent tension. A motorized roller 220K pulls the adhered webs of fabric 112 out of the adhesion activator station 234 and fixed rollers 220I and 220J prepare the adhered webs of fabric 112 to be pulled. The fabric preparation system 226C prepares the adhered webs of fabric 112 for the cutting station 238 and includes a motorized roller 220L controlled by the non-contact measurement sensor 228C.

The fabric preparation systems 226A and 226B may be configured to manage a relative speed differential or tension differential between the first and second webs of fabrics 102 and 104 before the heat press 236 cures the adhesive 100. For example, the fabric preparation systems 226A and 226B may ensure the webs of fabric 102 and 104 are in an approximately equal tension state before the adhesive 100 is cured. In another example, the fabric preparation systems 226A and 226B may ensure the rollers 220D and 220C have the same rotational speed. In some embodiments, the fabric transport systems 200A and 200B coordinate a rate at which the webs of fabric 102 and 104 are fed through the system 200. For example, the system 200 may coordinate the rotational speeds and rates and the turning on and off of the rollers 220 of each system that are motorized.

The non-contact measurement sensors 228 may include a proximity sensor used to determine if the distance (e.g., D) measured is outside the threshold and turn the motorized roller (e.g., the roller 220C or the top roller 224A) on and off when the slack is within and outside of the threshold. The non-contact measurement sensors 228 may also include an optical sensor, such as a laser-based measurement sensor, that can detect if the webs are moving toward or away from the optical sensor and continuously adjust a rotational speed of a motorized roller accordingly. In some embodiments, the non-contact measurement sensors 228 may include an ultrasonic sensor to measure the distance (e.g., D). While a few different types of non-contact measurement sensors 228 are discussed, it is to be understood that other non-contact measurement sensors 228 may be used.

In some embodiments, rollers 220A and/or 220D may be an anti-wrinkle auger that spreads either of the webs of fabric 102 and 104. For example, the rollers 220A and 220D may be bowed rollers, flat expanders, flexible expanders, edge nips, crowned rollers, or concave rollers.

In some embodiments, an upper and a lower conveyer belt may be used instead of the pinch rollers 224 to form the layered webs of fabric 110. In some embodiments, a roller (e.g., the roller 224A or 224B) and a conveyer belt may be used instead of the pinch rollers 224. In some embodiments, the pinch rollers 224 may supply heat, radiation, or moisture, instead of or in addition to pressure, to uniformly to the webs of fabric 102 and 104 to cure the adhesive 100 to form the adhered webs of fabric 112. In some embodiments, the pinch rollers may apply pressure, heat, radiation, or moisture only to certain regions of the webs of fabric 102 and 104 that have the adhesive 100 to form the layers of fabric 110 or the adhered webs of fabric 112.

In some embodiments, at least one of the rollers 220 may be a heated roller that heats at least one of the webs. Heat imparted into the webs, such as the webs of fabric 102 or 104, may beneficially remove wrinkles, or prepare the webs for processing at a subsequent station 230, 234, or 238. For example, rollers 220A and 220D may be heated to relax the first and second webs of fabric 102 and 104 before processing.

In some embodiments, the adhesion activator station 234 may use any combination of pressure, steam, heat, lasers and other types of lights or radiation, and the like on the layered webs of fabric 110 to activate and/or cure the applied adhesive 100 and permanently fuse the garment sections together. In some embodiments, the adhesion activator station 234 includes the fabric joining system such (e.g., the pinch rollers 224) that the adhesion activator station 234 forms the adhered webs of fabric 112 from the webs of fabric 102 and 104. In some embodiments, an adhesion activator station 234 is not used. For example, the adhesive 100 may cure by ambient temperature or by the applied force from the pinch rollers 224.

It should be understood that mechanisms other than rollers 220 may be used to perform one or more operations designed to move the webs or attach garment parts together depending on the type of fabric, the article design, the type of adhesive used and other manufacturing parameters. In some embodiments, any one of the stations 230, 234, and 238 may include a conveyer belt to move the webs into and out of the stations 230, 234, and 238. The rollers 220 may be configured differently depending on the configuration of the stations 230, 234, and 238. For example, the cutting station 238 may include a conveyer belt to pull the adhered fabric into the cutting station 238. In such an embodiment, the mechanical roller 220L may instead be a fixed roller and the non-contact measurement sensor 228C may control the conveyer belt of the cutting station 238.

In some embodiments, the fabric joining system may comprise other mechanisms than the pinch rollers 224. In some embodiments, the fabric joining system comprises a flat press to apply pressure or press the webs of fabric 102 and 104 together to form the layered webs of fabric 110. The flat press may include a heating source to cure an adhesive. In some embodiments, the adhesion activator station 234 may be used to form the layered webs of fabric 110 instead of the pinch rollers 224. In some embodiments, the flat press may be used with the pinch rollers 224.

In some embodiments, one or more rollers 220 may be actuated independently, and activated in a way to distribute the application of the pull or push forces along the webs of fabric 102 and 104 to reduce the chances of damaging the fabric by overly stressing, straining, or even tearing fabric web at one or more locations. In some embodiments, the rollers 220 and conveyers may be synchronized to facilitate the movement of the webs. For example, the rollers 220 and conveyers may start and stop movement at the same time to ensure the webs move through the system 200 at the same speed, beneficially preventing the webs from bunching up or forming wrinkles.

In some embodiments, mechanical means such as belts, chains gears, and sprockets are used to actuate sync the movement of the webs. In some embodiments, electronic controls along with variable speed motors and/or step motors may be used with any of the rollers 220 to control the movement and speed of webs to remain in sync and provide for accurate registration and alignment of the webs. In some embodiments, one or more of the webs may include perforations along one or more borders to be operable similar to a chain and sprocket conveyance mechanism operating on the one or more webs. The borders may be made of the same or different material, that may be perforated or include a greater friction coefficient, and where the border material is reinforced or inherently has greater tensile strength and provides for an area that may support and tolerate greater stress or strain forces than non-border portions of the webs materials can tolerate without affecting the quality of the webs.

In some embodiments, one or more webs may be coupled to a scaffolding (not shown) that includes the perforations along one or more borders. In some embodiments, the border perforations of the webs or the scaffolding may be the mechanism that receive the conveyance forces propelling the web along its path (e.g., pull the web along a given path pulled along by a system of one or more gears), control the movement of the web, and synchronize the movement of the webs to other moving components of the system 200.

In some embodiments, the system 200 may comprise a means to cool the webs, such as discussed in relation to FIG. 3.

In some embodiments, the garments remain fully or partially attached to the adhered webs of fabric 112 to continue to travel as part of the adhered webs of fabric 112 for easier material handling during additional processing. In some embodiments, additional processing may include customization operation of the garment including embroidery, DTG (direct-to-garment) printing, screen printing, etc. In some embodiments, the system 200 may comprise a customization station to perform the customization operation before the cutting station 238. For example, the customization station may be positioned before any one of the stations 230 or 234, or the pinch rollers 224. In some embodiments, after all processing is completed, the garments are cutout of the adhered webs of fabric 112 and processed for final packaging.

In some embodiments, movement of the webs may be done in a continuous manner. In some embodiments, movement of the webs may be done in a digitized or stepped manner. In some embodiments, the system 200 (e.g., the rollers 220 and pinch rollers 224) may momentarily stop moving at some of the stations 230, 234, and 238. In some embodiments, the system 200 continuously moves the webs such that the stations 230, 234, and 238 process the webs as they move.

FIGS. 3A and 3B are schematic side views of an automated garment manufacturing system 300, according to one embodiment. In particular, FIG. 3B is an enlarged view of a section of the automated garment manufacturing system 300 (referred to as the system 200) shown in FIG. 3A. The system 300 is similar to the system 200, except as otherwise noted.

The system 300 comprises a first fabric transport system 300A and a second fabric transport system 300B. The first fabric transport system 300A moves the first web of fabric 102 from the first fabric roll 201 and the second fabric transport system 300B moves the second web of fabric 102 from the second fabric roll 203. In the depicted embodiment, a roller system 321 (e.g., roller systems 321A and 321B) includes two rollers and feeds the webs of fabric 102 and 104 to the system 300. At least one of the two rollers of the roller system 321 may be motorized such that the motorized roller contacts the fabric roll 201 or 203 and rotates the fabric roll 201 or 203 at a selected speed, pulling or pushing the web of fabric 102 or 104 along the x-axis.

The system 300 further comprises a plurality of relaxer stations 342 (e.g., relaxer stations 342A-C) to relax the first and second webs of fabric 102 and 104. Each relaxer station 342A-C of the relaxer stations 342 includes an air table 343 (e.g., an air table 343A, 343B, or 343C) that forces air 354 through perforations 352 (e.g., perforations 352A, 352B, or 352C) in a surface 350 (e.g., a surface 350A, 350B, or 350C) of the air table 343, such as described in relation to FIGS. 3C-3E. The surface 350 may face the webs (e.g., the first or second webs of fabric 102 or 104) such that the air 354 is forced against the webs and relaxes the webs, beneficially reducing or eliminating wrinkles before processing at a station 230, 234, or 238. At least of portion of the relaxer stations 342 are positioned before the adhesion system. In the depicted embodiment, the relaxer station 342A is positioned in the first fabric transport system 300A before the adhesion station 230 and the relaxer station 342B is positioned in the second fabric transport system 300B before the pinch rollers 224. The relaxer stations 342A and 342B relax the first and second webs of fabric 102 and 104 as they are removed from the first and second fabric rolls 201 and 203 and before they are processed by any of the stations 230, 234, or 238. The relaxer station 342C is positioned in the first fabric transport system 300A before the pinch rollers 224, which beneficially relaxes the first web of fabric 102 before it is pressed with the second web of fabric 104 to form the layered webs of fabric 110. The relaxer stations 342B and 342C may help the webs of fabric 102 and 104 be in an equal tension state when fed through the pinch rollers 224.

The system 300 further comprises rollers 320 that function similar to the rollers 220 discussed in relation to FIGS. 2A and 2B. The rollers 320 may include any combination of fixed rollers, motorized rollers, or anti-wrinkle rollers or augers. In the depicted embodiment, motorized rollers 320B and 320J pull (e.g., feed or dispense) the webs of fabric 102 and 104 as the roller systems 321A and 321B feed the webs of fabric 102 and 104. Fixed rollers 320A and 320I guide and prepare the webs of fabric 102 and 104 to be pulled by the motorized rollers 320B and 320J.

A plurality of fabric preparation systems 326 (e.g., fabric preparation systems 326A-E) provides slack in at least one of in the webs similar to the fabric preparation systems 226 discussed in relation to FIGS. 2A and 2B, and include non-contact measurement sensors 228 (shown but not labeled). In the depicted embodiment, the fabric preparation systems 326A, 326C, and 326D are before the relaxer stations 342A, 342B, and 342C, respectively. The fabric preparation system 326B is before the adhesion station 230. The fabric preparation system 326E is before the cutting station 238. A roller 320 (e.g., the roller 320D, 320F, 320H, or 320L, or 320N) may be controlled by the non-contact measurement sensors 228 to pull at least one of the webs. A roller 320 (e.g., the roller 320C, 320G, 320K, or 320J) may guide the web to or urge the web against the rollers 320 that pull the webs.

The system 300 may also include a plurality of dancers 322, substantially similar to dancers 222. For example, a dancer 322A may rotate if there is too little or too much tension in the first web of fabric 102, and increase or decrease a rotation speed of the roller 320B, accordingly.

Figure 3C:
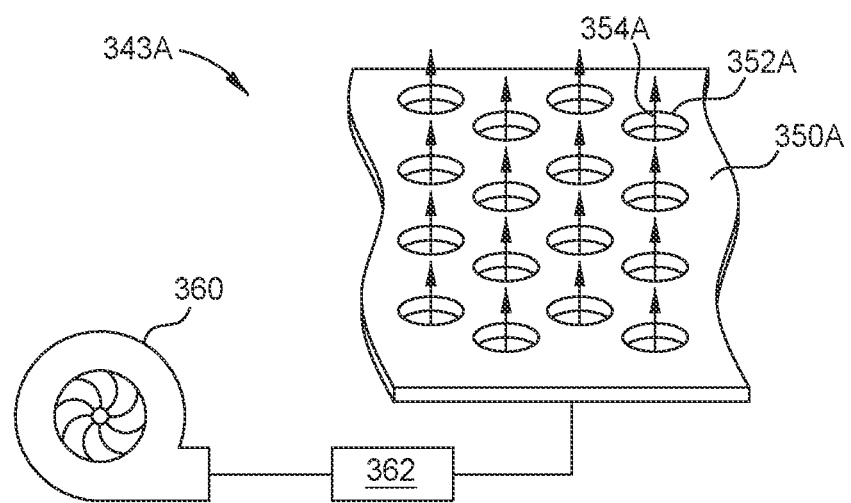
FIGS. 3C-3E are schematic perspective views of perforations in a relaxer station of FIGS. 3A and 3B, according to different embodiments.

In some embodiments, such as discussed in relation to FIG. 3C, at least one of the relaxer stations 342 comprises a heating element 362 to heat air 354A forced through the air table 343. The heated air 354A may beneficially relax the webs more than unheated air, and may decrease a time required for the relaxer stations 342 to process the webs. In some embodiments, at least one of the rollers 320 may be a heated roller (e.g., a roller 320 having a heating element) that heats at least one of the first or second webs of fabric 102 and 104 before at least one of the plurality of relaxer stations 342. In some embodiments, a heating element may be positioned above at least one relaxer station 342A-C of the relaxer stations 342 to heat the first or second webs of fabric 102 or 104. For example, a radiation heater, such as a heat lamp, may be used to heat the first or second webs of fabric 102 or 104.

In some embodiments, at least one of the relaxer stations 342 comprises a roller configured to urge the web against the air table 343. In some embodiments, the roller may be a motorized roller that moves the web over the relaxer station 342.

In some embodiments, such as embodiments having a heating element 362, a heated roller, or a heating element positioned above at least one relaxer station 342A-C, at least one cooling station may be used to cool the webs to a cooler or ambient temperature. In some embodiments, the cooling station includes a cooling air table to force air through perforations in a surface of the cooling air table and against the webs to cool the webs. For example, the cooling station may use ambient or cooled air to cool the webs.

In some embodiments, a shaker (not shown) may be used to shake the webs to relax the webs. The shaker may comprise any one of air pulse systems or grippers or rollers coupled to movable or rotatable arms. The shaker may be used in addition to or instead or the relaxer station 342 or anti-wrinkle rollers or augers. In some embodiments, the relaxer station 342 may comprise the shaker.

Figure 3D:
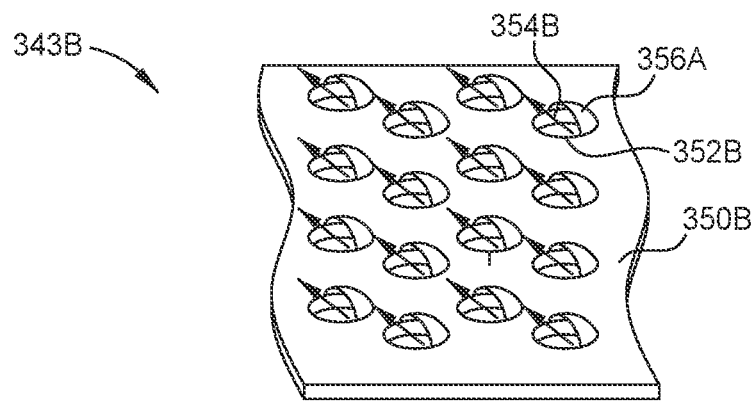
Figure 3E:
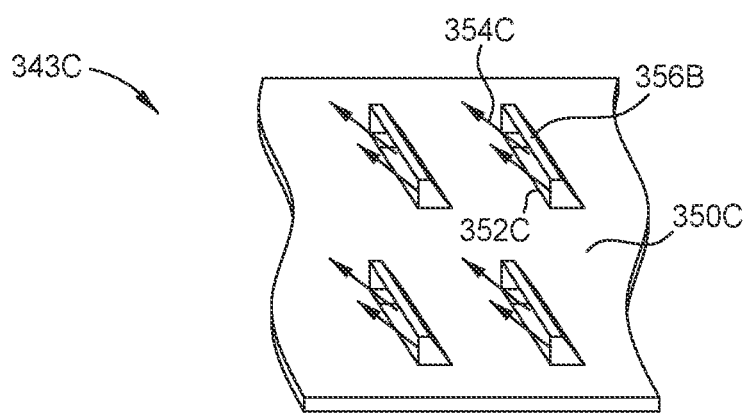

FIGS. 3C-3E are schematic perspective views of perforations 352 in a relaxer station 342 of FIGS. 3A and 3B, according to different embodiments.

The air table 343A shown in FIG. 3C includes circular perforations 352A in the surface 350A. A blower 360 forces the air 354A through the perforations 352A. A heating element 362 heats the air 354A before it is forced through the perforations 352A.

The air table 343B shown in FIG. 3D includes perforations 352B in the surface 350B having a flow director 356A that direct the air 354B in a desired direction, such as shown on the page. In addition to relaxing the fabric, directing the air 354B in the desired direction may help move the webs through the system 300.

The air table 343C shown in FIG. 3E includes perforations 352C in the surface 350C having a rectangular shape. The perforations 352C include a flow director 356B positioned along a longer dimension of the rectangle to direct the air 354C in a desired direction, such as shown on the page. The rectangular shape of the perforations 352C may allow more air 354C to flow than the circular perforations 352A or 352B. The rectangular shape of the perforations 352C may further allow the air 354C to contact a larger surface area of the webs than the air 354A and 354B of the circular perforations 352A or 352B, which may beneficially perform better at relaxing the webs.

Although discussed in relation to FIG. 3C, the blower 360 and/or the heating element 362 may be used with the air tables 343B and 343C described in relation to FIGS. 3D and 3E. In some embodiments, the blower 360 may include a rotatable fan to pull in ambient air and force the air 354 through the perforations 352. In some embodiments, the blower 360 may include a compressed air source. In some embodiments, the air table 343 does not include a blower 360 and instead may be fluidly coupled to a compressed air source. In some embodiments, the air tables 343A-C do not use a heating element 362.

In some embodiments, only a portion of the perforations 352 may be used to direct the air 354 in the desired direction. For example, only of portion of the perforations 352 may have a flow deflector 356. In some embodiments, the perforations 352 may include a directional nozzle to direct the air 354 in the desired direction. In some embodiments, the directional nozzle may be adjustable such that the direction the air 354 is forced may be changed.

In some embodiments, the shape of the perforations 352 may be different from what is shown in FIGS. 3C-3E. For example, an oval, square, or any polygonal shape may be used.

In some embodiments, any one of a filter, an air purifier, a dehumidifier, or an oil water separator may be used to clean the air 354. In some embodiments, a flow rate of the air 354 of the air table 343 is constant. In some embodiments, the flow rate of the air 354 of the air table 343 is variable.

Example Configurations for Multiple Garments

FIGS. 4A and 4B are schematic overhead views of a garment assembly process, according to one embodiment. In particular, FIG. 4A shows multiple garments 414 (e.g., a T-shirt body 414A and a sleeve 414B) cut from adhered webs of fabric 412A. The adhered webs of fabric 412A may be assembled similar to the adhered webs of fabric 112 discussed in relation to FIGS. 2 and 3. For example, the adhered webs of fabric 412A may include a first web of fabric (not visible) and a second web of fabric 404A.

An adhesive 100 bondline bonds the first and second webs of fabric. Cut lines 407A and 407B are used to cut contours in the adhered webs of fabric 412A to form the T-shirt body 414A and the sleeve 414B (referred to as garments 414A and 414B) of a T-shirt. In the depicted embodiment, the garments 414A and 414B are laid out side-by-side such that there are two of the garments 414A and 414B along a width (W) of the adhered webs of fabric 412A. An automated garment manufacturing system (e.g., the system 200 or 300) may use the side-by-side layout to beneficially increase an output and/or efficiency of the garment manufacturing process.

FIG. 4B shows multiple garments 114 and 414 cut from adhered webs of fabric 412B. The adhered webs of fabric 412B may include a first web of fabric (not visible) and a second web of fabric 404B. In the depicted embodiment, several rows of garments 114 and 414 are cut from the adhered webs of fabric 412B. A row of T-shirts 114, a row of T-shirts 414C, a row of sleeves 414B, and a row of a row of T-shirt bodies 414A are cut along a width W2 of the adhered webs of fabric 412B. The T-shirt 414C is similar to the T-shirt 114, except cut lines 406 in the first web of fabric, which are similar to the cut lines 106 discussed in relation to FIG. 1B, include a cut for a lower cut neckline than the cut lines 407C in the second web of fabric 404B.

Although the garments 114 and 414 are cut along different rows in the embodiments shown in FIGS. 4A and 4B, the garments 114 and 414 may be cut in any pattern or arrangement.

Additional Examples of Automated Garment Manufacturing Systems

Figure 5A:
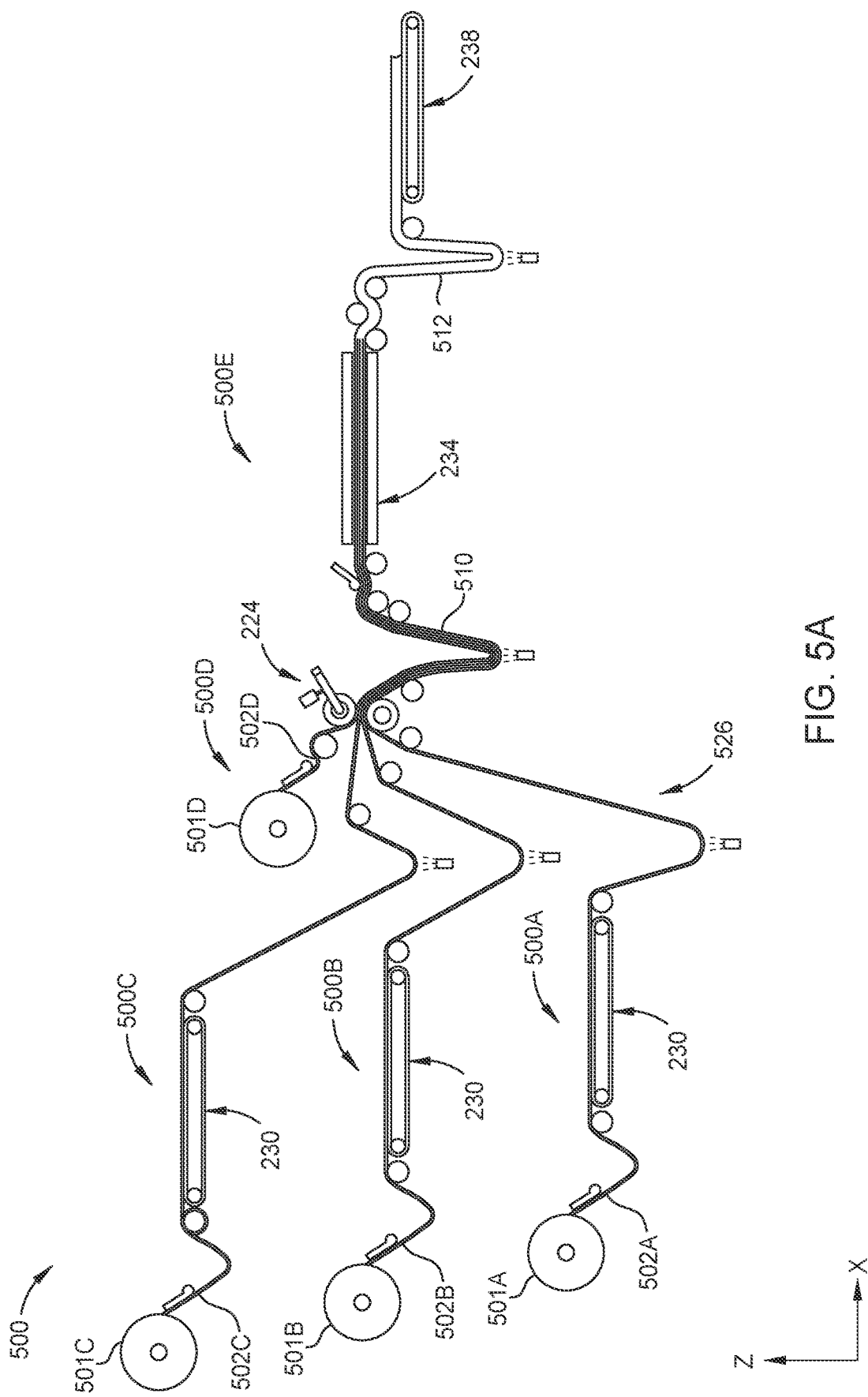
FIG. 5A is a schematic side view of an automated garment manufacturing system, according to one embodiment.

FIG. 5A is a schematic side view of an automated garment manufacturing system 500, according to one embodiment. The automated garment manufacturing system 500 (referred to as the system 500) is configured similar to the system 200 in FIGS. 2A and 2B, except as noted.

The system 500 includes a plurality of fabric transport systems 500A-E. A first fabric transport system 500A moves a first web of fabric 502A from a first fabric roll 501A. A second fabric transport system 500B moves a second web of fabric 502B from a second fabric roll 501B. A third fabric transport system 500C moves a third web of fabric 502C from a third fabric roll 501C. A fourth fabric transport system 500D moves a fourth web of fabric 502D from a fourth fabric roll 501D. The fabric transport systems 500A-C include an adhesion station 230 to apply the adhesive 100 to the webs of fabric 502A-C as described in relation to FIGS. 5A-5E.

A fifth fabric transport system 500E adheres the webs of fabric 502A-D to each other. The fifth fabric transport system 500E includes a fabric joining system, which in the depicted embodiment is the pinch rollers 224. The pinch rollers 224 apply a force to press the webs of fabric 502A-D together to form layered webs of fabric 510. In some embodiments, a flat press may be used instead of the pinch rollers 224 to press the webs of fabric 502A-D together to form the layered webs of fabric 510. The fifth fabric transport system 500E further includes the adhesion activator station 234, which cures the adhesive 100 and forms adhered webs of fabric 512. In some embodiments, the adhesion activator station may be used to form the webs of fabric 510. The cutting station 238 cuts the adhered webs of fabric 512 into a garment as described in relation to FIG. 5F.

The system includes a plurality of fabric preparation systems 526 (one of which is labeled). The fabric preparation systems 526 are similar to the fabric preparation systems 226 and may include motorized rollers and a non-contact measurement sensors (shown but not labeled).

Figure 5B:
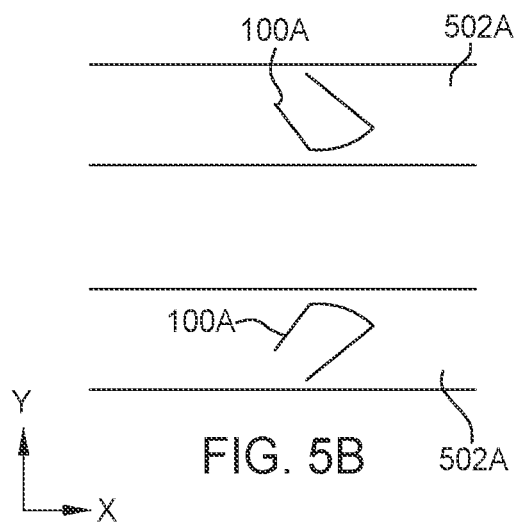
FIGS. 5B-5F are schematic overhead views of a garment assembly process, according to one embodiment.

FIGS. 5B-5F are schematic overhead views of a garment assembly process, according to one embodiment. In particular, FIG. 5B shows a first adhesive 100A bondline dispensed on a first web of fabric 502A. The first adhesive 100A may be dispensed by the adhesion station 230 of the first fabric transport system 500A to outline contours of sleeves. In the depicted embodiment, the first web of fabric 502A includes two webs of fabric that will be used to form a first side of the sleeves. The first adhesive 100A is dispensed on each web of fabric. In some embodiments, the two webs of fabric share the first fabric roll 501A. In some embodiments, each of the two webs of fabric may be on a separate fabric roll.

Figure 5C:
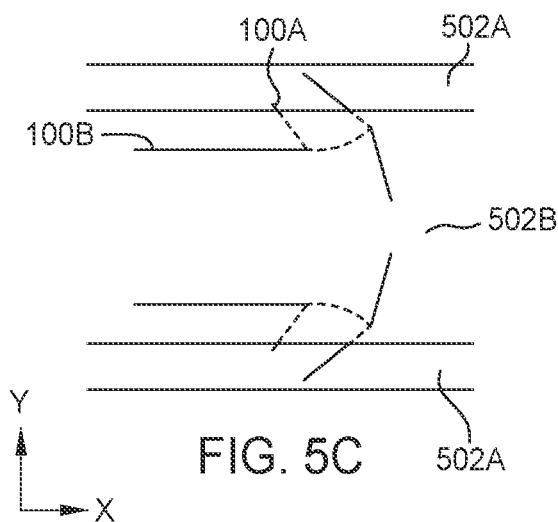

The embodiment in FIG. 5C depicts a second web of fabric 502B overlaid on top of the first web of fabric 502A. A second adhesive 1006 bondline is dispensed on the second web of fabric 502B to outline contours of a T-shirt body, and may be dispensed by the adhesion station 230 of the second fabric transport system 500B. In the depicted embodiment, the second web of fabric 502B will be used to form a first side of the T-shirt body.

Figure 5D:
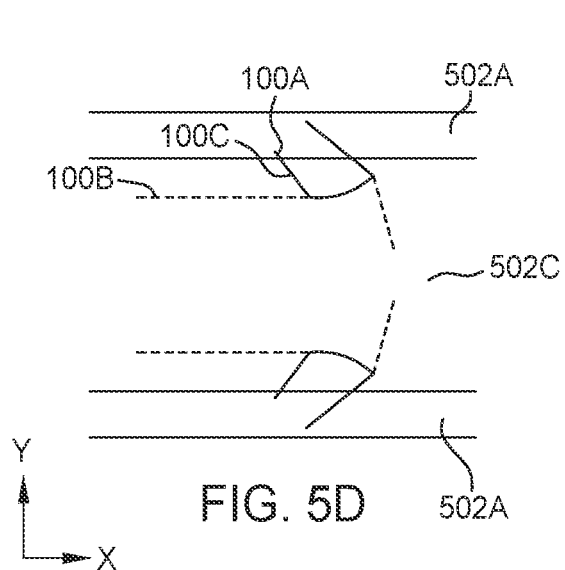

The embodiment in FIG. 5D depicts a third web of fabric 502C overlaid on top of the second web of fabric 502B. A third adhesive 100C bondline is dispensed on the third web of fabric 502C to outline contours of the sleeves, and may be dispensed by the adhesion station 230 of the third fabric transport system 500C. In the depicted embodiment, the third web of fabric 502C will be used to form a second side of the T-shirt body.

Figure 5E:
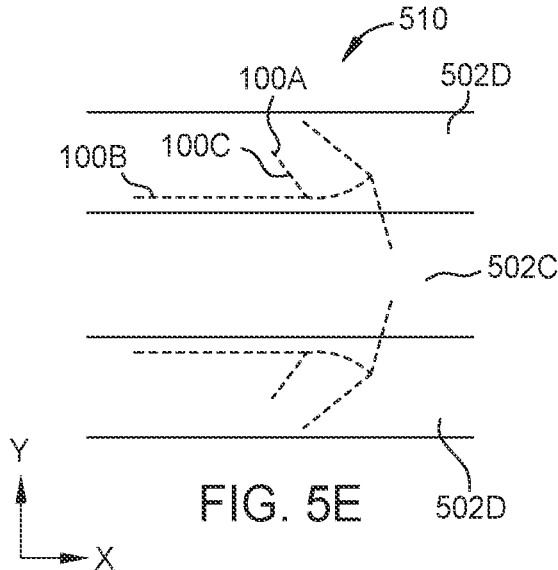

The embodiment in FIG. 5E depicts a fourth web of fabric 502D overlaid on top of the third web of fabric 502C to form the layered webs of fabric 510. In the depicted embodiment, the fourth web of fabric 502D includes two webs of fabric that will be used to form a second side of the sleeves. The layered webs of fabric 510 may be formed using the pinch rollers 224 of the system 500 (FIG. 5A). In some embodiments, the two webs of fabric share the fourth fabric roll 501D or may be on a separate fabric roll.

Figure 5F:
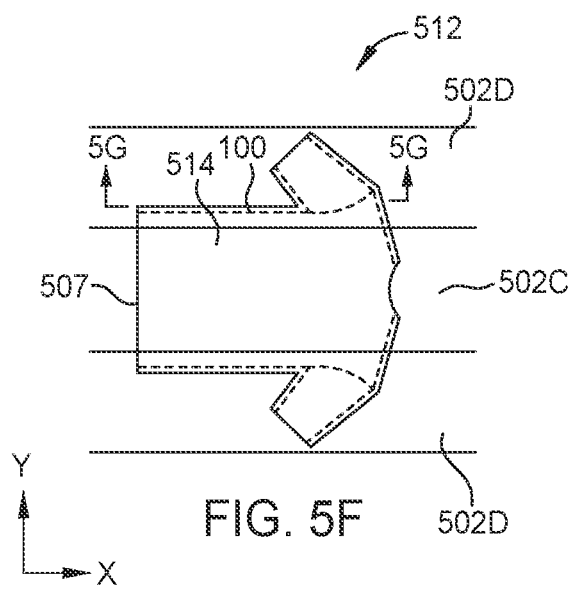

The embodiment in FIG. 5F depicts cut lines 507 used to cut a T-shirt 514 from the adhered webs of fabric 512. The adhered webs of fabric 512 may be formed from the layered webs of fabric 510 using the adhesion activator station 234 of the system 500 and the T-shirt 514 may be cut from the adhered webs of fabric 512 using the cutting station 238 of the system 500 (FIG. 5A).

The operations discussed in relation to FIGS. 5A-5F may be performed at different points in time. For example, the webs of fabric 502A-D may all be pressed together by the pinch rollers 224 of the system 500 (FIG. 5A) at the same time after adhesive 100 has been applied. In some embodiments, a single adhesion station 230 may be used to dispense the adhesive 100 on the webs of fabric 502. In some embodiments, an adhesion station 230 may dispense the adhesive 100 on at least two different webs of fabric 502.

Figure 5G:
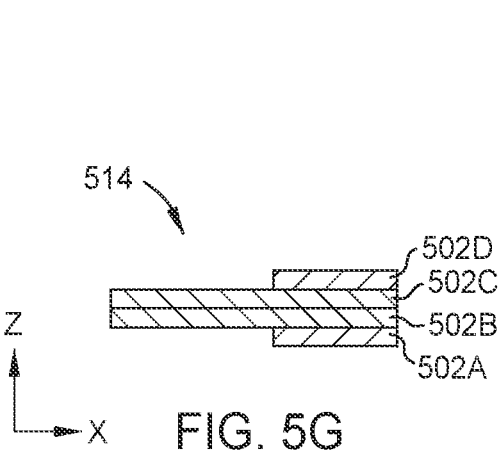
FIG. 5G is a cross-sectional view of the garment assembly process of FIG. 5F.

FIG. 5G is a cross-sectional view of the garment assembly process of FIG. 5F. In particular, FIG. 5F shows the different webs of fabric 502A-D that are adhered to form the T-shirt 514.

Although four webs of fabric 502A-D are discussed, more or less webs of fabric 502 may be used in other embodiments. For example, three or more webs of fabric 502 may be used to create a T-shirt (e.g., the T-shirt 114) having a pocket. A respective fabric transport system may be configured to move each web of fabric of the three or more webs of fabric from a respective fabric roll (e.g., the first fabric transport system 500A moves the first web of fabric 502A, the second fabric transport system 500B moves the second web of fabric 502B, and so forth). Each respective fabric transport system may include the adhesion station 230 or a single adhesion station 230 may dispense the adhesive to multiple fabric transport systems. The fabric preparation systems may be configured to provide slack in at least one of the webs of fabric while each fabric transport system moves each web of fabric.

In some embodiments, the operations discussed in FIGS. 5A-5G may be performed with a system configured similar to the system 300 in FIGS. 3A and 3E. For example, the system 500 may include a plurality of relaxer stations (e.g., relaxer stations 342 in FIGS. 3A and 3B) to relax the webs.

In some embodiments, the webs (e.g., webs of fabric 502A and 502B) may not be webs of fabric and may include a conveyor that carries a partially or fully completed component that is synchronized with the webs of fabric (e.g., the webs of fabric 502B and 502C) to arrive at a joinder point in a position to be joined with the remainder of the garment. In some embodiments, joinder may refer to any kind of joining action of one or more fabric layers to form a seam or hem. In some embodiments, the conveyer may carry a pocket to be adhered to webs of fabric used to create a T-shirt (e.g., the webs of fabric 102 and 104 and the T-shirt 114).

Figure 6A:
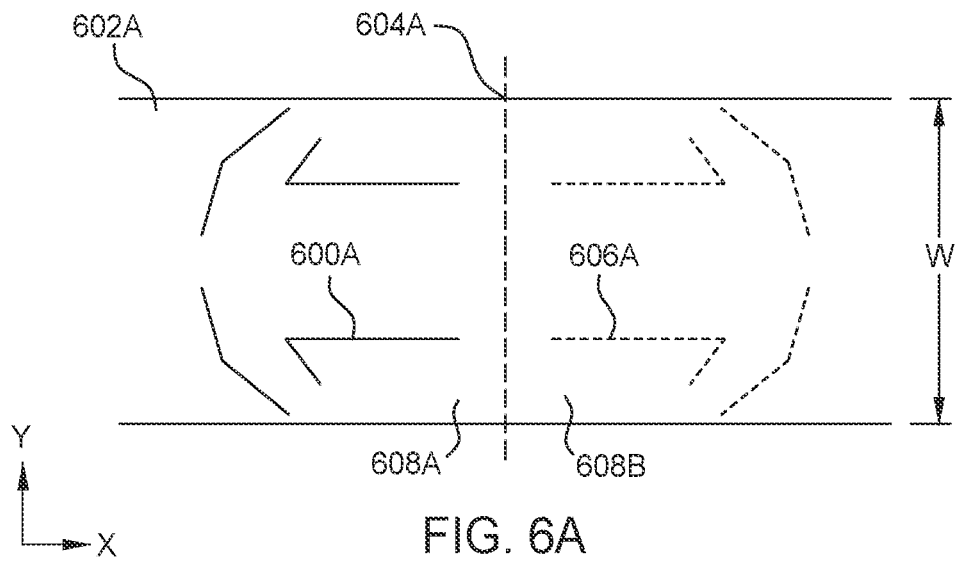
FIGS. 6A and 6B are schematic overhead views of a garment assembly process, according to different embodiments.
Figure 6B:
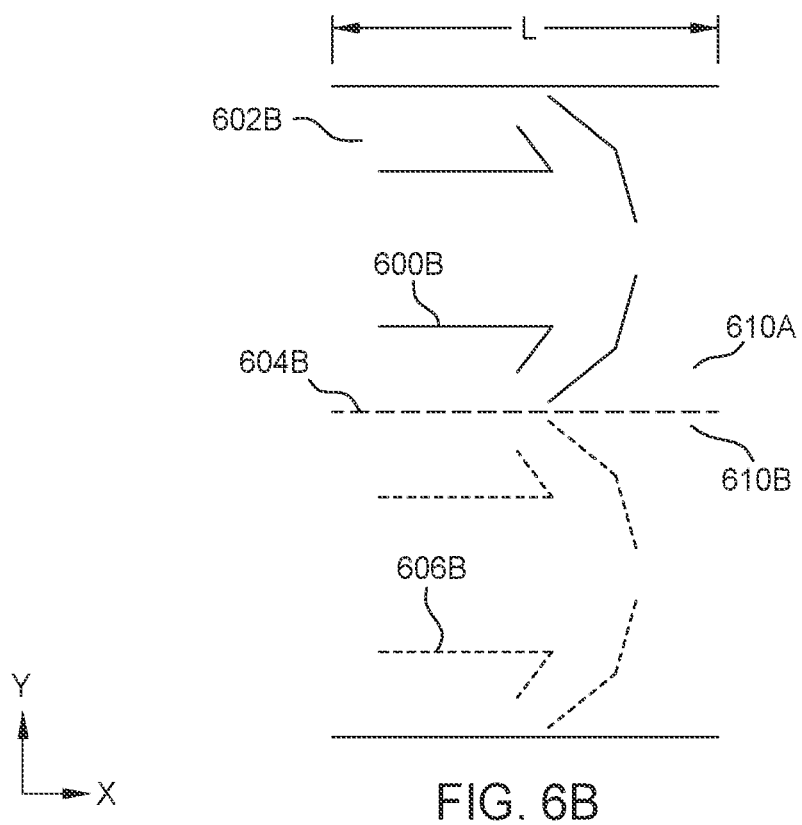

FIGS. 6A and 6B are schematic overhead views of a garment assembly process, according to different embodiments. In particular, FIGS. 6A and 6B show garment assembly processes that use a single web of fabric 602 (e.g., a web of fabric 602A or 602B).

The embodiment in FIG. 6A shows an adhesive 600A bondline dispensed on a first portion 608A of the web of fabric 602A. The web of fabric 602A further includes a second portion 608B. The first and second portions 608A and 608B are separated by a fold line 604A, which runs along a width (W) of the web of fabric 602A. The web of fabric 602A is folded along the fold line 604A and the adhesive 600A contacts the mating bondline 606A on the second portion 608B of the web of fabric 602A.

The embodiment in FIG. 6B shows an adhesive 600B bondline dispensed on a first portion 610A of the web of fabric 602B. The web of fabric 602B further includes a second portion 610B. The first and second portions 610A and 610B are separated by a fold line 604B, which runs along a length (L) of the web of fabric 602B. The web of fabric 602B is folded along the fold line 604B and the adhesive 600B contacts the mating bondline 606B on the second portion 610B of the web of fabric 602B.

Figure 6C:
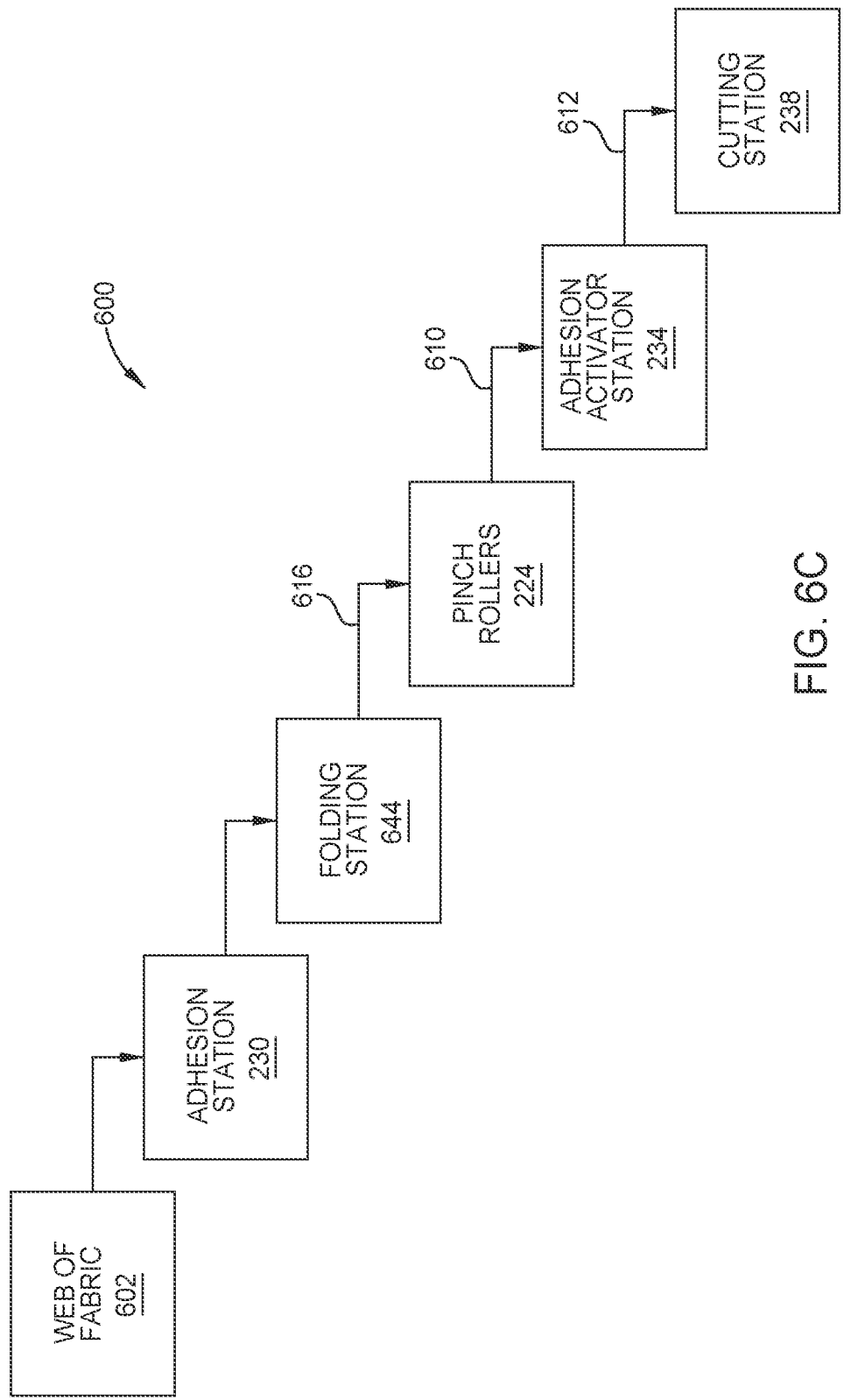
FIG. 6C is a schematic view of an automated garment manufacturing system, according to one embodiment.

The embodiments of FIGS. 6A and 6B may be used with some embodiments of the systems 200 and 300 of FIGS. 2 and 3. For example, either web of fabric 602 may be fed into the system 200 or 300 having a folding station 644 (FIG. 6C). The web of fabric 602 may be folded along the fold line 604 by the folding station 644 to form a folded web of fabric 616 that is pulled through the pinch rollers 224 to form a layered web of fabric 610, as described in FIG. 6C. The adhesive 600 on the layered web of fabric may be cured using the adhesion activator station 234 to form an adhered web of fabric 612 (FIG. 6C), which may be cut to form a T-shirt. In the embodiments depicted in FIGS. 6A and 6B, the fold line 604 is a mirror line such that each portion 608 or 610 of the web of fabric 602 contains a half of the T-shirt and the two halves of the T-shirt are bonded when the adhered web of fabric 612 is formed. In some embodiments, the adhesive 600 may be identical to the adhesive 100. In some embodiments, the adhesive 600 may be different from the adhesive 100. In some embodiments, different adhesives may be used for different portions of the garment (e.g., the sleeves and the T-shirt body).

FIG. 6C is a schematic view of an automated garment manufacturing system 600, according to one embodiment. In particular, FIG. 6C shows the automated garment system 600 (referred to as the system 600) that may be used with a single web a fabric 602. For example, the system 600 may be used with the web of fabric 602A or 602B.

The system 600 may comprise several of the same subsystems and components as the systems 200 or 300. For example, the system 600 may include the adhesion station 230, the pinch rollers 224, the adhesion activator station 234, and the cutting station 238. The system 600 further includes the folding station 644, which may be positioned after the adhesion station 230 and before the fabric joining system (e.g., the pinch rollers 224). In the depicted embodiment, the pinch rollers 224 form the layered web of fabric 610 from the folded web of fabric 616. Once the adhesive 600 cures, for example, by the adhesion activator station 234, the adhered web of fabric 612 is formed. The adhered web of fabric 612 is cut by the cutting station 238 to form a garment.

In some embodiments, the pinch rollers 224 are not used. In some embodiments, the folding station 644 may guide the folded web of fabric 616 into the adhesion station 234 to form the adhered web of fabric 612.

Example Methods for Automated Manufacturing of Garments

Figure 7A:
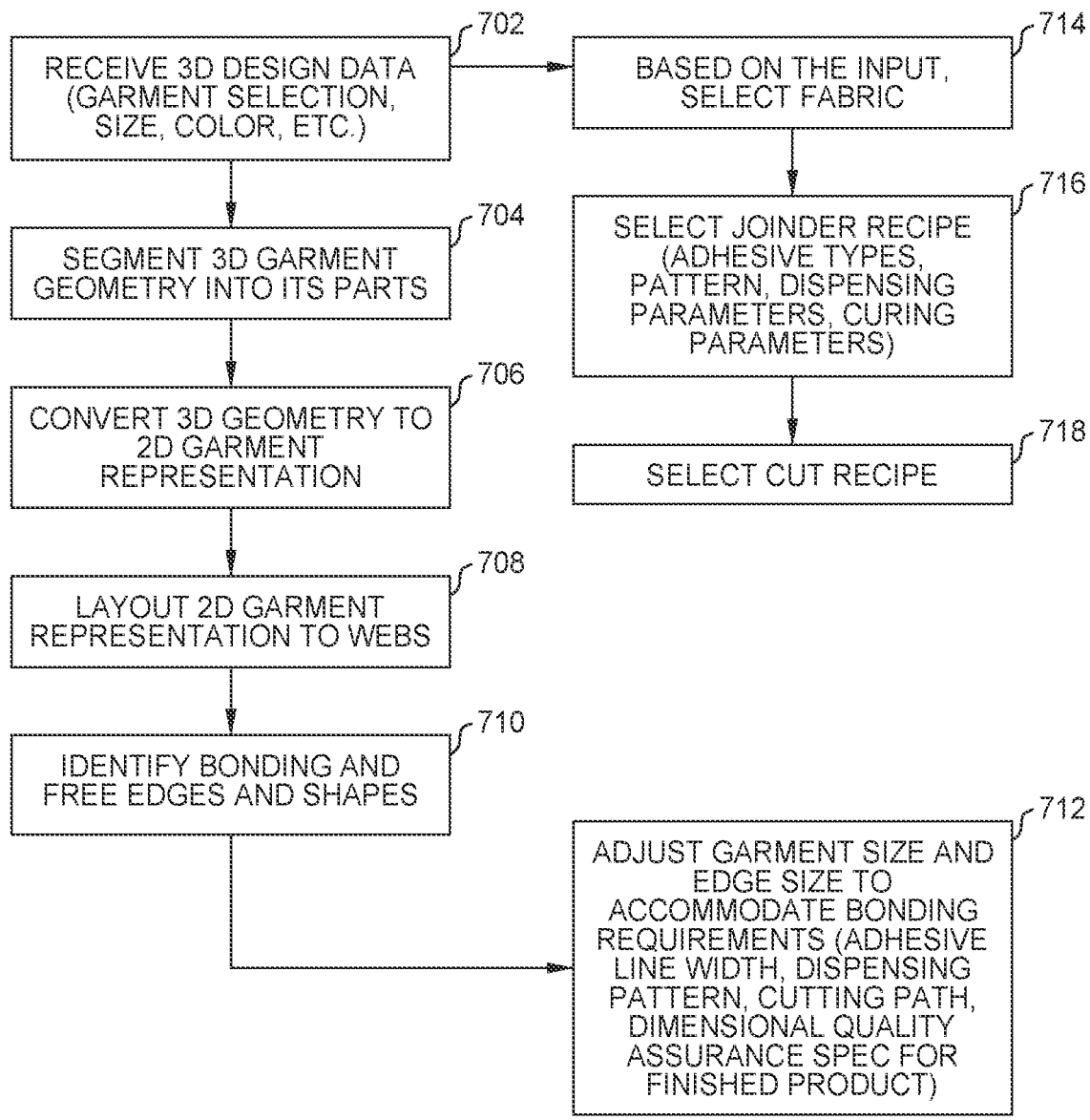
FIG. 7A is a flow chart for processing design data used in an automated garment manufacturing process, according to one embodiment.

FIG. 7A is a flow chart for processing design data used in an automated garment manufacturing process, according to one embodiment. In some embodiments, the automated garment manufacturing process may be used with the system 200, 300, or 500 discussed in relation to FIGS. 2, 3, and 5.

As seen in FIG. 7A, an automated garment manufacturing process using an adhesive may start with the operation 702 of receiving garment manufacturing design data including the selection of a garment style, selection of colors, the types of accessories such as pockets and zippers that are required, personalization choices such as a logo created using various garment printing processes, embroidery or other embellishment using other accessories. Additional design data may include three-dimensional (3D) measurements, dimensions and sizes of the particular garment (e.g., the T-shirt 114 or 414) or and other particulars of the article as measured in three dimensions, for example by a specialized scanners. In operation 702, based on the 3D design data received, the garment type is selected (e.g. a T-shirt, long sleeve shirt or a jacket). Similarly, based on the received design data, fabric is selected and the size of the garment is determined. The size of a garment may be based on actual 3D measurements in the case of custom fit garments or based on a ready-to-wear size chart. In the case of a custom fit garment, the measurements of the various parts of the garment are determined directly from actual measurements obtained by either a scanner or a manual measuring. In the case of a ready-to-wear garment, dimensions of the various garment parts such as the length, width and girth of the body of the garment, the sleeves, the neckline, etc. may be derived from the size of the garment derived from a generalized size to dimension correspondence table.

In operation 704, the three-dimensional garment design data are converted into the dimensions of individual components of the garment to be manufactured. The garment dimensions may include length and width of the body, the sleeves, the neckline, etc. of the garment. Based on the type of the fabric selected, the garment component dimensions may be adjusted to account for fabric properties such as stretch.

In operation 706, the 3D geometries of the garment components are converted to two-dimensional (2D) representations. In operation 708, the 2D representations of the garment are mapped or laid out onto one or more webs of fabric (e.g., any of webs of fabric 102, 104, 110, 112, 404, 502). In some embodiments, the pattern of mapping garment components on one or more webs of fabric is laid out in panels in such a way to simplify fabrication, minimize material waste, or both.

In operation 710, based on the dimensions of the laid-out garment, the type of fabric, or the aesthetic design of the garment, the bonding edges, shapes and the free edges of the garment are identified. The layout of the garment on the web of fabric may include the steps of selecting which garment component panels are to be laid-out on which web of fabric. Additionally, considerations for the layout of the garment panels may include laying out the garment pieces inside-out or outside-in, headfirst or bottom first, etc.

In operation 712, the garment layout dimensions may be adjusted to accommodate the appropriate bonding border requirements including adhesive line width, adhesive dispensing pattern, cutting path and dimensional quality assurance specification for the finish garment.

In a parallel process flow path, in operation 714, based on the received 3D garment design data, the automated garment manufacturing system may select the corresponding web of fabric and load each web of fabric in preparation for the start of manufacturing. In some embodiments, the selection and loading and preparation of the web of fabric may be performed manually, semi-manually or automatically. In some embodiments, some or most of the material handling operations required at this step may be done automatically, for example using robots and cobots.

In operation 716, based on the garment design data, a joinder recipe is selected which determines the adhesive type to be used, the adhesive patterns (e.g., straight, zigzag, serpentine) and the adhesive curing parameters.

Finally, in operation 718 the cutting recipe is determined based on garment design data. For example, a particular cutting recipe may be used to minimize material waste or achieve a certain aesthetic design requirement.

Figure 7B:
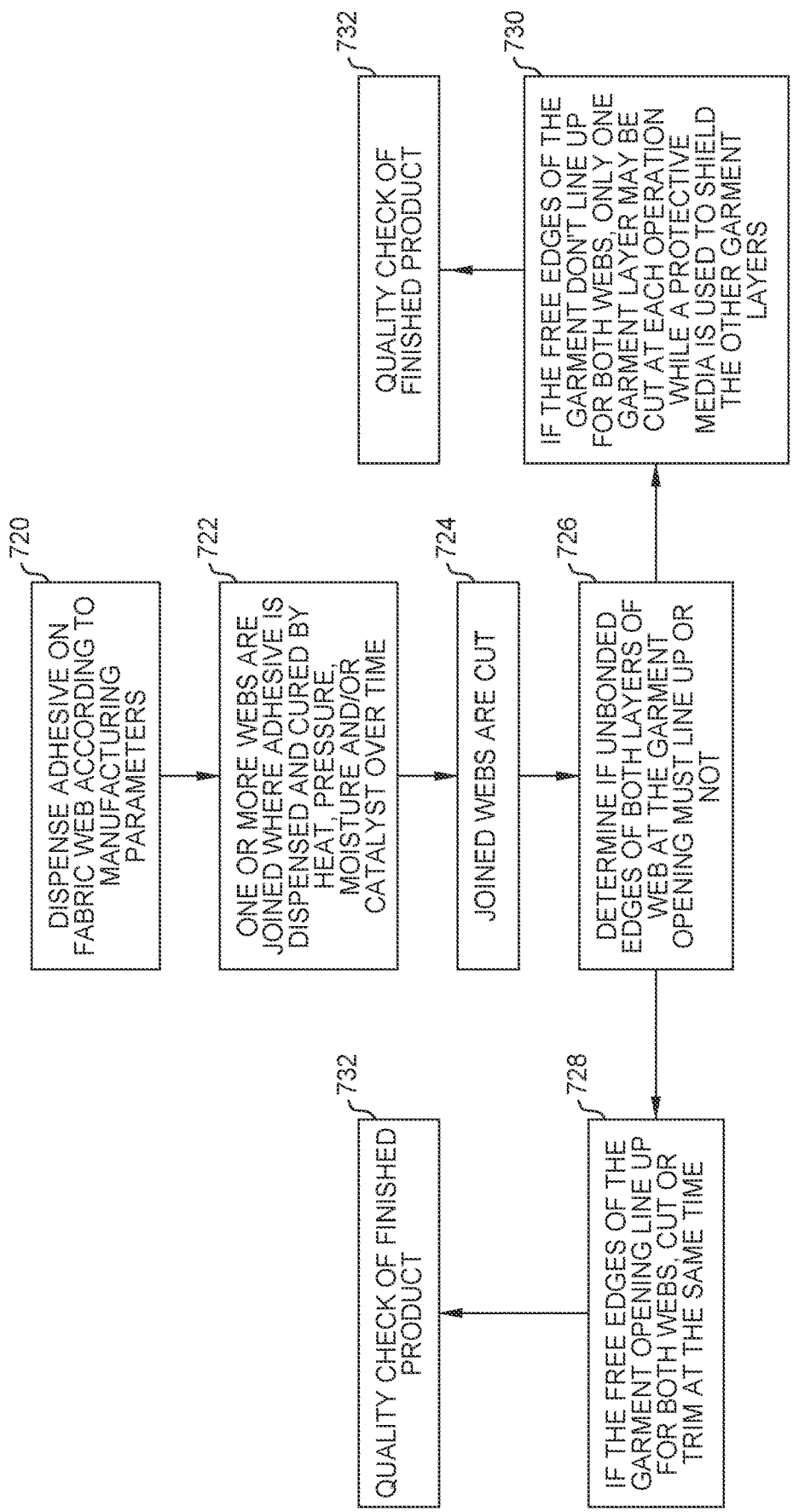
FIG. 7B a flow chart for cutting and joinder processes used in an automated garment manufacturing process, according to one embodiment.

FIG. 7B a flow chart for cutting and joinder processes used in an automated garment manufacturing process, according to one embodiment. In some embodiments, the automated garment manufacturing process may be used with the system 200, 300, or 500 discussed in relation to FIGS. 2, 3, and 5. The operations detailed in FIG. 7B are generally directed to forming edges and seams for a garment in an automated fashion.

In operation 720, adhesive (e.g., the adhesive 100 or 600) is applied to on one or more moving webs of fabric (e.g., any of webs of fabric 102, 104, 110, 112, 404, 502) per the manufacturing recipe created in operation 716. For example, the adhesion station 230 of systems 200, 300, or 500 may apply the adhesive as discussed in relation to FIGS. 2, 3, and 5. In operation 722, one or more webs of fabric are joined at least along areas where adhesive has been applied. Heat, pressure, moisture, radiation, and/or catalysts may be applied for a given period of time (as per the manufacturing recipe) to the joined areas to activate the adhesive and cure the bond between the joined regions of the webs of fabric. For example, the adhesion activator station 234 of systems 200, 300, or 500 may cure the adhesive as discussed in relation to FIGS. 2, 3, and 5. Each of the parameters used to create a joint may be individually tuned and adjusted to achieve the optimum bonded joint based on the garment type, the joint type, dimensions, type of adhesive, whether the joint must be waterproof or not, and the aesthetics of the joint.

In operation 724, the joined regions that are formed by bonding one or more areas of the webs of fabric together are cut on the outside perimeter of the joint, along the edge of the joint or at some distance within the joint. In some embodiments, the cutting along the joints may be complete along the entire garment perimeter, in which case the garment is hereafter fully detached from the webs of fabric. In some embodiments, the cutting operation may be limited to specific boundaries of the garment that may include bonded edges and free edges where no adhesive has been applied. In some embodiments, the cutting operation may achieve both a functional and an aesthetic function. In some embodiments, the cutting operation may be limited to certain areas of the garment perimeter and the garment remains attached to the webs of fabric until further processing. In some embodiments, the cutting is performed using needles to perforate the web of fabric but not to completely detach the garment from the web of fabric. In some embodiments, the final detachment of the garment from the web of fabric may be performed at a later stage in the garment manufacturing.

In some embodiments, in operation 726, based on the garment design data and the corresponding manufacturing requirements, the system determines whether each layer of a garment part with unbonded free edges (e.g. sleeve holes, neck hole) must align to each other or not. For example, for increased comfort wear, some T-shirt designs may require the layer of fabric layer forming the back of the neck section to be longer (taller as measured from the T-shirt hemline) than the front layer of fabric comprising the neck hole.

In some embodiments, in operation 728, if the garment design data requires the open edges of the garment in some area to be aligned between the two webs of fabric, then a single cutting operation may be performed on both layers of the garment. For example, both the lower and upper layers of fabric forming the sleeve hole may be cut in a single cut operation.

In some embodiments, in operation 730, if the garment design data requires the opening fabric edges not to align (e.g., the fabric layer of the back of neck hole must be longer than the fabric layer at the front of the neck hole), for each cutting operation, one fabric layer may be cut while the other fabric layers may be protected by an insert between the cutter and the other layers of fabric. For example, in the case of some T-shirt necklines, such as the T-shirt 414C discussed in relation to FIG. 4B, the edge of the back layer of fabric for the neck hole must be higher than the edge of the front layer of fabric for the neck hole. In such cases, the cutting operation may be performed in separate steps, using one or more cutters to cut a given fabric layer while protecting other fabric layers using a protective insert.

In operation 732, a quality inspection of the finished garment may be performed. In some embodiments, the quality inspection may be performed by human operators through a visual inspection. In some embodiments, a quality inspection may be performed using cameras using artificial intelligence. In some embodiments, the quality inspection may be performed while the finished garment is still attached to the web of fabric to simplify any material handling issues.

Figure 8:
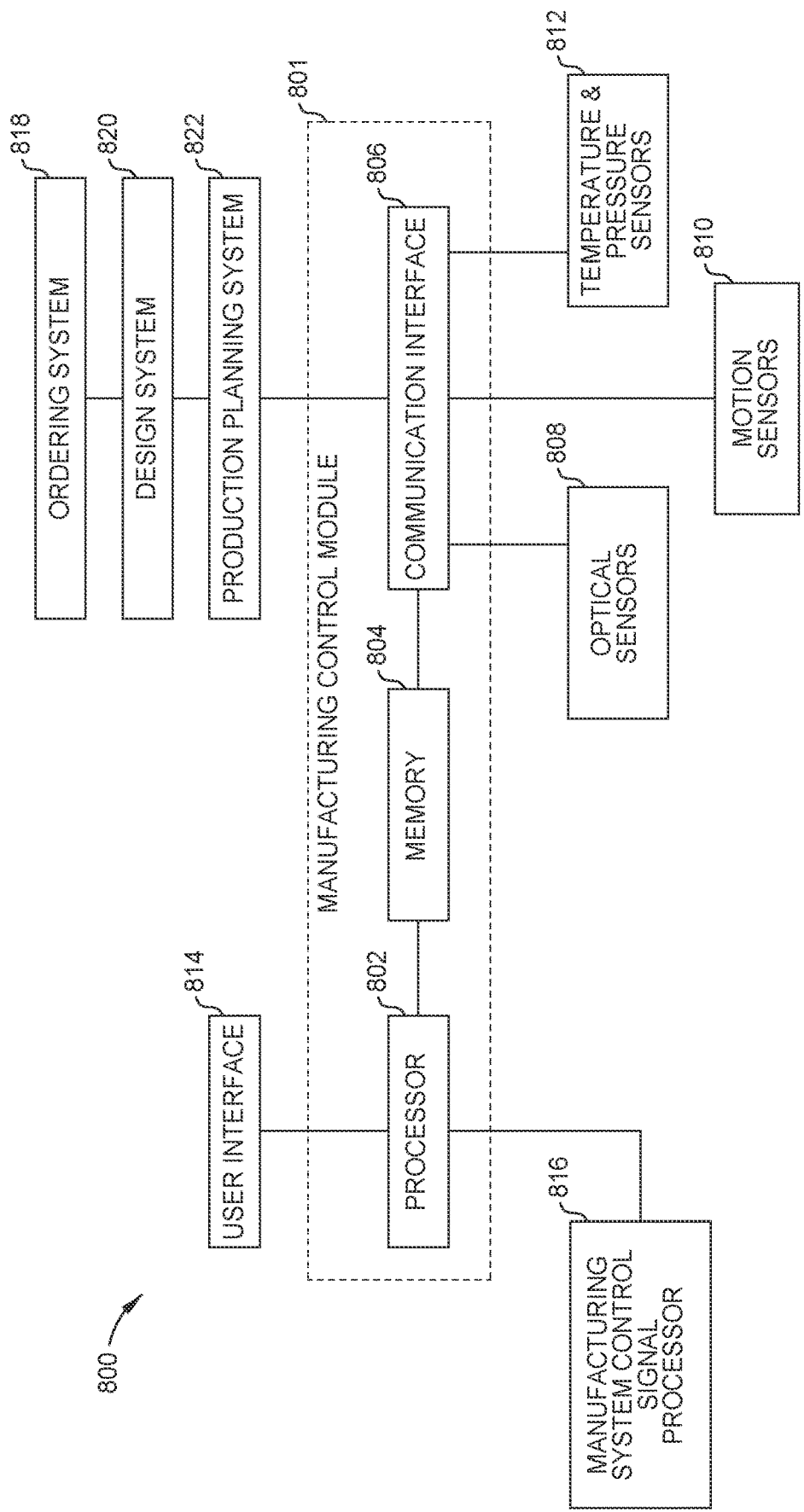
FIG. 8 a block diagram of a control system for an automatic garment manufacturing system, according to one embodiment.

FIG. 8 is a block diagram of a control system 800 for an automatic garment manufacturing system, according to one embodiment. In some embodiments, the control system 800 may be used with the system 200, 300, or 500 discussed in relation to FIG. 2, 3, or 5.

In the depicted embodiment, the illustrative control system 800 includes a manufacturing control module 801 coupled to various components including one or more ordering system 818, one or more design systems 820, one or more production planning systems 822, one or more user interface devices 814, and one or more manufacturing system and control signal processor. In some embodiments, the manufacturing control module 801 may include one or more processors (e.g., processing equipment 802) coupled to memory modules (e.g., a memory 804) and one or more communication interfaces 806 to provide means for communicating with various automated garment manufacturing system inputs including one or more sensors 808 (such as optical sensors and/or cameras), sensors 810 (such as motion sensors), and sensors 812 (such as temperature and pressure sensors). In various embodiments, various other types of sensors, not shown here, may provide relevant manufacturing parameters such as the level of moisture present in the factory air, viscosity of adhesive liquid, etc. Additionally, the manufacturing control module 801 may include one or more power sub-systems and power backup systems not shown here.

The manufacturing control module 801 may be implemented at least partially in one or more computers, embedded systems, terminals, control stations, handheld devices, modules, any other suitable interface devices, or any combination thereof. In some embodiments, the components of manufacturing control module 801 may be communicatively coupled via one or more communications buses not shown here. A manufacturing system control signal processor 816 may interface with the manufacturing control module 801 through the processing equipment 802. In some embodiments, the manufacturing system control signal processor 816 may be part of a separate piece of manufacturing equipment, such as any of the stations 230, 234, and 238 discussed in relation to FIGS. 2, 3, and 5.

Processing equipment 802 may include a processor (e.g., a central processing unit), cache, random access memory (RAM), read only memory (ROM), any other suitable components, or any combination thereof that may process information regarding the automated garment manufacturing system. Memory 804 may include any suitable volatile or non-volatile memory that may include, for example, random access memory (RAM), read only memory (ROM), flash memory, a hard disk, any other suitable memory, or any combination thereof. Information stored in memory 804 may be accessible by processing equipment 802 via communications bus not shown. For example, computer readable program instructions (e.g., for implementing the techniques disclosed herein) stored in memory 804 may be accessed and executed by processing equipment 802. In some embodiments, memory 804 includes a non-transitory computer readable medium for storing computer executable instructions that cause processing equipment 802 (e.g., processing equipment of a suitable computing system), to carry out a method for controlling the automated garment manufacturing systems and processes. For example, memory 804 may include computer executable instructions for implementing any of the control techniques described herein.

In some embodiments, communications interface 806 includes a wired connection (e.g., using IEEE 802.3 Ethernet, or universal serial bus interface protocols), wireless coupling (e.g., using IEEE 802.11 "Wi-Fi," Bluetooth, or via cellular network), optical coupling, inductive coupling, any other suitable coupling, or any combination thereof, for communicating with one or more systems external to manufacturing control module 801. For example, communications interface 806 may include a USB port configured to accept a flash memory drive. In a further example, communications interface 806 may include an Ethernet port configured to allow communication with one or more devices, networks, or both. In a further example, communications interface 806 may include a transceiver configured to communicate using 3G, 4G, or 5G standards over a cellular network.

In some embodiments, user interface devices 814 includes a wired connection (e.g., using IEEE 802.3 Ethernet, or universal serial bus interface, tip-ring-seal RCA type connection), wireless coupling (e.g., using IEEE 802.11 "Wi-Fi," Infrared, Bluetooth, or via cellular network), optical coupling, inductive coupling, any other suitable coupling, or any combination thereof, for communicating with one or more of user interface devices 814. User interface devices 814 may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, user interface devices 814 may include a keyboard such as a QWERTY keyboard, a numeric keypad, any other suitable collection of hard command buttons, or any combination thereof. In a further example, user interface devices 814 may include a mouse or any other suitable pointing device that may control a cursor or icon on a graphical user interface displayed on a display screen. In a further example, user interface devices 814 may include an audio device such as a microphone, a speaker, headphones, any other suitable device for providing and/or receiving audio signals, or any combination thereof. In some embodiments, user interface devices 814 need not be included (e.g., the manufacturing control module 801 need not receive user input nor provide output to a user).

In some embodiments, a sensor interface (not shown) may be used to supply power to various sensors, a signal conditioner (not shown), a signal pre-processor (not shown) or any other suitable components, or any combination thereof. For example, a sensor interface may include one or more filters (e.g., analog and/or digital), an amplifier, a sampler, and an analog to digital converter for conditioning and pre-processing signals from sensor(s) 808, 810, and 812. In some embodiments, the sensor interface communicates with sensor(s) via communicative coupling which may be a wired connection (e.g., using IEEE 802.3 Ethernet, or universal serial bus interface), wireless coupling (e.g., using IEEE 802.11 "Wi-Fi," or Bluetooth), optical coupling, inductive coupling, any other suitable coupling, or any combination thereof.

Sensor(s) 808, 810, and 812 may include any suitable type of sensor, which may be configured to sense any suitable property or aspect of automated garment manufacturing systems and processes, any other system, or any combination thereof. In some embodiments, sensor(s) 808, 810 and 812 include linear encoders, rotary encoders, or both, configured to sense relative positions, speed, temperature, pressure, etc. In some embodiments, sensor(s) 808 includes various types of optical sensors including cameras configured to capture images (e.g., time-lapse imaging) of various aspects of the operation of the automated garment manufacturing systems and processes. In some embodiments, temperature and pressure sensor(s) 812 include one or more temperature sensors such as, for example, a thermocouple, a thermistor, a resistance temperature detector (RTD), any other suitable sensor for detecting temperature, or any combination thereof. For example, sensor(s) 812 may include a thermocouple arranged to measure the temperature and/or viscosity of liquid adhesive to be applied to the webs.

Figure 9:
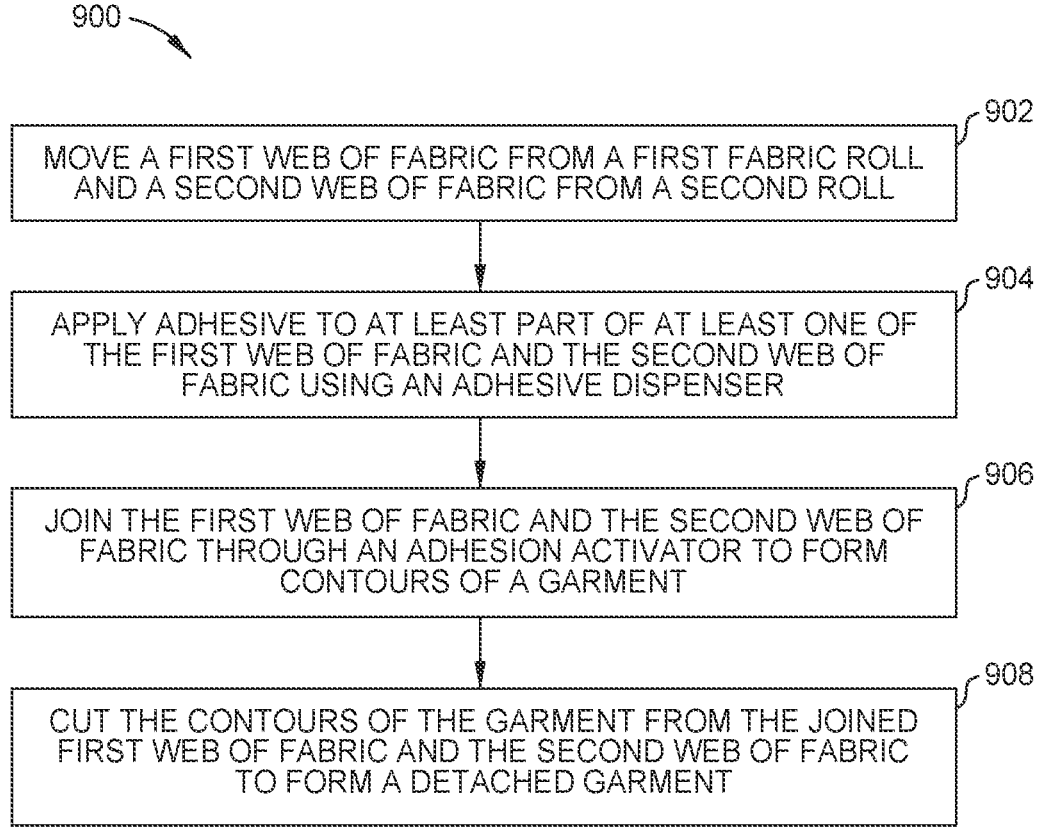
FIG. 9 is a flowchart of a method for automated manufacturing of garments, according to one embodiment.

FIG. 9 is a flowchart of a method 900 for automated manufacturing of garments, according to one embodiment. The method 900 begins at block 902, where a system (e.g., the systems 200 and 300 in FIGS. 2 and 3) moves a first web of fabric from a first fabric roll and a second web of fabric from a second roll as discussed in relation to FIGS. 2 and 3. In some embodiments of method 900, a plurality of fabric preparation systems provide slack in the first web of fabric and the second web of fabric. Each fabric preparation system of the plurality of fabric preparation systems comprises a motorized roller configured to pull feed the first web of fabric or the second web of fabric and a non-contact measurement sensor for measuring the slack or monitoring the stretching in the first web of fabric or the second web of fabric. The motorized roller adjusts a rotation rate based on the non-contact measurement sensor.

At block 904, an adhesion station (e.g., the adhesion station 230 in FIGS. 2, 3, and 5) applies an adhesive to at least part of at least one of the first web of fabric and the second web of fabric using an adhesive dispenser as discussed in relation to FIGS. 2, 3, 5, and 6.

At block 906, a fabric joining system (e.g., the pinch rollers 224 in FIGS. 2, 3, and 5) and/or an adhesion activator station (e.g., the adhesion activator station 234 in FIGS. 2, 3, and 5) join the first web of fabric and the second web of fabric to form contours of a garment as discussed in relation to FIGS. 2, 3, 5, and 6. In some embodiments, of the method 900, the first web of fabric and the second web of fabric move in sync so that the first web of fabric and the second web of fabric are aligned when joined. The plurality of fabric preparation systems are configured to ensure the first and second webs of fabric move at about the same speed when joined.

At block 908, a cutting station (e.g., the cutting station 238 in FIGS. 2, 3, and 5) cut the contours of the garment from the joined first web of fabric and the second web of fabric to form a detached garment as discussed in relation to FIGS. 2, 3, and 5.

Some embodiments further include relaxing the first web of fabric and the second web of fabric through a plurality of relaxer stations. Each relaxer station of the plurality of relaxer stations comprises an air table configured to force air through perforations in a surface of the air table and against the first web of fabric or the second web of fabric to relax the first web of fabric or the second web of fabric. At least of portion of the plurality of relaxer stations are positioned before the adhesive dispenser.

In some embodiments, relaxing the first web of fabric and the second web of fabric through a plurality of relaxer stations further comprises applying heat to the first web of fabric and the second web of fabric.

Some embodiments further include applying a force to press the first web of fabric and the second web of fabric together before curing the adhesive with the adhesion activator station.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments, and advantages disclosed herein are merely illustrative and are not considered elements or limitations of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system for automated manufacturing of garments, the system comprising:
    a first fabric transport system configured to move a first web of fabric from a first fabric roll;
    a second fabric transport system configured to move a second web of fabric from a second fabric roll;
    an adhesion system comprising an adhesive dispenser configured to apply an adhesive to at least part of at least one of the first web of fabric or the second web of fabric;
    a plurality of relaxer stations configured to relax the first web of fabric and the second web of fabric, wherein:
        each relaxer station of the plurality of relaxer stations comprises an air table configured to force air through perforations in a surface of the air table and against the first web of fabric or the second web of fabric to relax the first web of fabric or the second web of fabric, and wherein at least of portion of the plurality of relaxer stations are positioned before the adhesion system; and
    a plurality of fabric preparation systems configured to provide slack in at least one of the first web of fabric or the second web of fabric while the first fabric transport system moves the first web of fabric and the second fabric transport system moves the second web of fabric, wherein each fabric preparation system of the plurality of fabric preparation systems comprises:
        a motorized roller configured to feed the first web of fabric or the second web of fabric; and
        a non-contact measurement sensor for measuring the slack in the first web of fabric or the second web of fabric, wherein the motorized roller adjusts a rotation rate based on the non-contact measurement sensor; and
    a cutting station configured to cut the coupled first and second webs of fabric into a garment.

2. The system of claim 1, wherein at least one of the relaxer stations comprises a heating element configured to heat the air forced through the air table.

3. The system of claim 1, further comprising a heated roller configured to heat the first web of fabric or the second web of fabric before at least one of the plurality of relaxer stations.

4. The system of claim 1, further comprising a heating element positioned above at least one relaxer station of the plurality of relaxer stations configured to heat the first web of fabric or the second web of fabric.

5. The system of claim 1, further comprising at least one cooling station configured to cool the first web of fabric or the second web of fabric to an ambient temperature, wherein the cooling station comprises a cooling air table configured to force air through perforations in a surface of the cooling air table and against the first web of fabric or the second web of fabric to cool the first web of fabric or the second web of fabric.

6. The system of claim 1, wherein:
    the adhesion system further comprises an adhesion station having the adhesive dispenser,
    the adhesion system further comprises an adhesion activator station configured to cure the adhesive to couple the first web of fabric to the second web of fabric, wherein the adhesion activator station comprises a heat press, and
    at least one of the plurality of relaxer stations is positioned before the adhesion station and before the heat press.

7. The system of claim 1, wherein:
    the adhesion system further comprises an adhesion station having the adhesive dispenser,
    the adhesion system further comprises an adhesion activator station configured to cure the adhesive to couple the first web of fabric to the second web of fabric, wherein the adhesion activator station comprises a heat press, and
    at least one of the plurality of fabric preparation systems is positioned before the adhesion station and before the adhesion activator station.

8. The system of claim 7, wherein at least one of the plurality of fabric preparation systems is positioned before the cutting station.

9. The system of claim 7, wherein the plurality of fabric preparation systems are configured to manage a relative tension differential between the first and second webs of fabric before the heat press cures the adhesive.

10. The system of claim 7, further comprising a fabric joining system configured to apply a force to press the first web of fabric and the second web of fabric together before curing the adhesive with the adhesion activator station.

11. The system of claim 1, wherein the non-contact measurement sensor is positioned below the slack in the first web of fabric or the second web of fabric and configured to measure a distance between the non-contact measurement sensor and the slack in the first web of fabric or the second web of fabric.

12. The system of claim 1, wherein the system is configured to move three or more webs of fabric, wherein the system further comprises a respective fabric transport system configured to move each web of fabric of the three or more webs of fabric from a respective fabric roll.

* * * * *